US012789749B2

(12) United States Patent
Rabiah et al.

(10) Patent No.: US 12,789,749 B2
(45) Date of Patent: Nov. 10, 2026

(54) TOKEN-BASED VEHICULAR SECURITY SYSTEM

(71) Applicant: THE REGENTS OF THE UNIVERSITY OF CALIFORNIA, Oakland, CA (US)

(72) Inventors: Abdulrahman Bin Rabiah, Riverside, CA (US); Yugarshi Shashwat, Riverside, CA (US); Silas Richelson, Riverside, CA (US); Nael Abu-Ghazaleh, Riverside, CA (US); Anas Alsoliman, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 35 days.

(21) Appl. No.: 18/381,759

(22) Filed: Oct. 19, 2023

(65) Prior Publication Data

US 2025/0128676 A1 Apr. 24, 2025

(51) Int. Cl.
*B60R 25/24* (2013.01)

(52) U.S. Cl.
CPC .................................. *B60R 25/241* (2013.01)

(58) Field of Classification Search
CPC .................................................... B60R 25/241
See application file for complete search history.

(56) References Cited

U.S. PATENT DOCUMENTS 11,558,205 B2 * 1/2023 Jin ........................ H04L 9/3268
12,519,661 B2 * 1/2026 Simplicio, Jr. ....... H04L 9/3268
2013/0212659 A1 * 8/2013 Maher .................. G05D 1/0022 726/6
2019/0319793 A1 * 10/2019 Schooler ............... H04W 12/06
2020/0008027 A1 * 1/2020 Yabuuchi ......... G08G 1/096725
2020/0280842 A1 * 9/2020 Liu ......................... H04W 4/44
2020/0314645 A1 * 10/2020 Soryal ................... H04W 4/027
(Continued)

OTHER PUBLICATIONS

Abdo, et al., "Application level attacks on Connected Vehicle Protocols", USENIX Association, 22nd International Symposium on Research in Attacks, Intrusions and Defenses, 459-471 (2019).
(Continued)

*Primary Examiner* — Oleg Survillo
(74) *Attorney, Agent, or Firm* — Ivan Miles Posey, Esq.

(57) ABSTRACT

A method and apparatus for operating a token-based vehicular security system (TVSS) is disclosed. The method includes communicating with a communicatively connected vehicle (CV) communicatively connected to the token based vehicular security system (TVSS); issuing a pseudonym certificate (PC) to the communicatively connected vehicle (CV) from one of a plurality of roadside units (RSUs) with the token-based vehicular security system (TVSS) having a low latency; and providing a standard unforgeability security guarantee for the token based vehicular security system (TVSS) without violating anonymity or unlinkability properties. The system includes a roadside unit (RSU) communicatively connected to a roadside unit backend included in a cloud computing environment; a certificate authority (CA) included in the cloud computing environment; a SETUP protocol; a TOKENGEN protocol; a PSEUDOGEN; and a REVOKE protocol.

7 Claims, 24 Drawing Sheets

(56) References Cited

U.S. PATENT DOCUMENTS

| | | | | |
|---|---|---|---|---|
| 2022/0158853 | A1* | 5/2022 | Simplicio | H04L 9/0861 |
| 2022/0232014 | A1* | 7/2022 | Shi | G07C 5/008 |
| 2023/0362162 | A1* | 11/2023 | Khare | H04L 63/0807 |
| 2024/0177603 | A1* | 5/2024 | Ujiie | G08G 1/0968 |
| 2024/0241938 | A1* | 7/2024 | Qi | H04L 9/32 |
| 2025/0124782 | A1* | 4/2025 | Liu | H04W 4/44 |

OTHER PUBLICATIONS

Adams, et al., "Development of DSRC Device and Communication System Performance Measures", Technical Report. United States Department of Transportation Intelligent Transportation Systems Joint Program Office, 1-296 (2016).
Alexiou, et al., "VeSPA: Vehicular security and privacy-preserving architecture", Conference: Proceedings of the 2nd ACM workshop on Hot topics on wireless network security and privacy, DOI:10. 1145/2463183.2463189, 6 pages (2013).
Barth, et al., "Intelligent Transportation Systems and Greenhouse Gas Reductions", Curr Sustainable Renewable Energy Rep 2, 90-97 (2015).
Bißmeyer, et al., "CoPRA: Conditional Pseudonym Resolution Algorithm in VANETs", 2013 10th annual conference on wireless on-demand network systems and services (WONS). IEEE, 9-16 (2013).
Bißmeyer, et al., "PREparing SEcuRe VEhicle-to-X Communication Systems", Preserve, Project No. IST-269994, Part of the Seventh Framework Program Funded by the EC-DG INFSO, 106 pages (2014).
Brecht, et al., "A Security Credential Management System for V2X Communications", IEEE Transactions on Intelligent Transportation Systems, vol. 19, No. 12, 3850-3871 (2018).
Chiang, A, "V2X Promises a New Era of Efficient and Safe Intelligent Transportation", https://www.advantech.com/en-us/resources/faq/v2x-promises-a-new-era-of-smart-transportation, 5 pages (2022).
Chiesa, et al., "Decentralized Anonymous Micropayments", Annual International Conference on the Theory and Applications of Cryptographic Techniques, Springer, 72 pages (2016).
Douceur, J, "The Sybil Attack", International workshop on peer-to-peer systems, Springer, 251-260 (2002).
ETSI TS, "Intelligent Transport Systems (ITS); Security; Trust and Privacy Management", ETSI TS 102 941 V1.4.1, 75 pages (2021).
European Commission, "Certificate Policy for Deployment and Operation of European Cooperative Intelligent Transport Systems (C-ITS) Release 1.1", https: //transport.ec.europa.eu/system/files/2018-05/c-its_certificate_policy-v1.1. pdf, 81 pages (2018).
Gisdakis, et al., "SEROSA: SERvice Oriented Security Architecture for Vehicular Communications", IEEE Vehicular Networking Conference, 111-118 (2013).
Haenggi, M, "Outage, Local Throughput, and Capacity of Random Wireless Networks", IEEE Transactions on Wireless Communications 8 (8), 4350-4359 (2009).
Khodaei, et al., "Evaluating On-demand Pseudonym Acquisition Policies in Vehicular Communication Systems", Proceedings of the First International Workshop on Internet of Vehicles and Vehicles of Internet. 7-12, 6 pages (2016).
Khodaei, et al., "Scaling Pseudonymous Authentication for Large Mobile Systems", in Proceedings of the 12th Conference on Security and Privacy in Wireless and Mobile Networks. 174-184 (2019).
Khodaei, et al., "SECMACE: Scalable and Robust Identity and Credential Management Infrastructure in Vehicular Communication Systems", arXiv:1707.05518v1 [cs.CR], 14 pages (2017).
Ma, et al., "Pseudonym-on-demand: a new pseudonym refill strategy for vehicular communications", 2008 IEEE 68th Vehicular Technology Conference. IEEE, 1-5 (2008).
Najm, et al., "Frequency of Target Crashes for IntelliDrive Safety Systems", National Highway Traffic Safety Administration DOT HS 811 381, 50 pages (2010).
NHTSA, "Summary of Motor Vehicle Crashes", Traffic Safety Facts 2018 Data, 10 pages (2020).
Papadimitratos, et al., "Secure Vehicular Communication Systems: Design and Architecture", IEEE Communications Magazine, 100-109 (2008).
Patel, et al., "Ticket Based Service Access for the Mobile User", Proceedings of the 3rd annual ACM/IEEE International Conference on Mobile computing and networking, MOBICOM 97 Budapest Hungary, 223-233 (1997).
Perry, et al., "Dedicated Short-Range Communications Roadside Unit Specifications", Technical Report, United States Dept. of Transportation, 1-126 (2017).
Raviglione, et al., "Characterization and Performance Evaluation of IEEE 802.11p NICs", Proceedings of the 1st ACM MobiHoc Workshop on Technologies, models, and Protocols for Cooperative Connected Cars, 7 pages (2019).
Raviglione, et al., "Experimental Assessment of IEEE 802.11-based V21 Communications", The Eighteenth ACM International Symposium on Performance Evaluation of Wireless Ad Hoc, Sensor, and Ubiquitous Networks (PE-WASUN) 2021 tenutosi a Alicante (Spain) nel Nov. 2021) [10.1145/3479240.3488506], 9 pages (2021).
Rupp, et al., "P4R: Privacy-preserving pre-payments with refunds for transportation systems", International Conference on Financial Cryptography and Data Security. Springer, 205-212 (2013).
Schaub, et al., "V-tokens for Conditional Pseudonymity in VANETs", IEEE Wireless Communications and Networking Conference (WCNC 2010), Sydney, Australia, 6 pages, (2010).
Smith, T, "Let's Revoke: Scalable Global Certificate Revocation", Network and Distributed Systems Security (NDSS) Symposium, 14 pages (2020).
TCITS ETSI, "Intelligent Transport Systems (ITS); Vehicular Communications; Basic Set of Applications; Definitions", Tech Rep, ETSI TR 102 6382009, 81 pages (2009).
Tesei, et al., "IOTA-VPKI: a DLT-based and Resource Efficient Vehicular Public Key Infrastructure", 2018 IEEE 88th Vehicular Technology Conference (VTC-Fall). IEEE, 1-6 (2018).
TS ETSI, "Intelligent Transport Systems (ITS); Security; ITS communications security architecture and security management; Release 2", ETSI TS 102 940, 48 pages (2021).
USDOT, "Security Credential Management System (SCMS)", U.S. Department of Transportation, https://its.dot.gov/resources/scms.htm (2022).
USDOT, "Wyoming DOT Connected Vehicle Pilot Operational Readiness Plan—Final", U.S. Department of Transportation Intelligent Transportation Systems Joint Program Office, 1243 pages, www.its.dot.gov/index.htm (2018).
Wiedersheim, et al., "SeVe- Com—Security and privacy in Car2Car ad hoc networks", 2009 9th International Conference on Intelligent Transport Systems Telecommunications, (ITST). IEEE, 658-661 (2009).
Wright, et al., "Cyber hack triggers mass Fiat Chrysler car recall", Financial Times, https://www.ft.com/content/2bafe3e0-321f-11e5-8873-775ba7c2ea3d (2015).
Zhang, et al., "Double-Spending With a Sybil Attack in the Bitcoin Decentralized Network", IEEE transactions on Industrial Informatics 15, 10, 5715-5722 (2019).

* cited by examiner

1. Initialization: The challenger C initializes several data structures, specified in the next section, to keep track of what transpires in the system during the course of the game. *For example, C creates sets $V_{corrupt} \subset V$, both initialized to empty, which keep track of the corrupt vehicles in the system. Or C can keep track of the corrupt tokens of a vehicle v in the set $T^{v}_{corrupt} \subset T^{v}$.*
2. Online Phase: The adversary A interacts with C using the specified queries, defined later. *For example, if A wants to add a new vehicle to the system, A would use the CreateVehicle($\cdot$) query, at which point C would run Alg 1 and add $(v, EC_v)$ to V. Or, if A decides it wishes to attack the anonymity of our scheme, it would issue the Anonymity query.*
3. The Final Message: A sends its final message and the game ends. A wins if it meets one of the winning conditions specified in the next section.

FIG. 4

In our security formalization, we give the adversary A the power to query before and after the challenge message is received from C. To win, the adversary must satisfy one of the conditions below.

- When the adversary sends its final message(the guess bit *b'*) in case of an Anonymity challenge, the probability of the correct message must be 1/2 + *non - negl.*
- When the adversary sends its final message(the guess bit *b'*) in case of an Unlinkability challenge, the probability of the correct message must be 1/2 + *non - negl.*
- When the adversary sends its final message, m signed by a PC of the vehicle *v*, in case of a Forgery challenge, the probability of the correct message must be *non - negl.*

FIG. 5

Initialization Data: The Long-term keys to the vehicle, pseudonym certificates, and tokens are the critical components of the security model. For these data to be used and presented, we will need algorithms 1, 2, and 3.

(1) A set $V$ which will contain public/private key pairs $(v, EC_V)$; $V$ represents the set of all cars which ever exist in the system; $V$ is initialized to the emptyset;

(2) A set $V_{corrupt} \subset V$ of corrupt cars; $V_{corrupt}$ is initialized to the emptyset;

(3) For every $v \in V$, $C$ keeps track of a set $T^V$ which represents the set of tokens for the vehicle $v$; $C$ also maintains $T^V_{corrupt} \subset T^V$, the set of corrupted tokens for $v$; every time a new $v$ is added to $V$, $T^V$ and $T^V_{corrupt}$ are initializes to empty sets;

(4) For each $v \in V$, $C$ keeps track of a set of valid pseudonym certificate $P^V$ at a given time interval; If the vehicle's PC is exposed, then the same is added to the set $P^V_{corrupt}$;

Interaction Queries: These queries emulate how the adversary might interact with the system in the real world.

(1) CreateVehicle(•) : $C$ runs Algorithm 1, generates $(v, EC_V)$ which it adds to $V$, $C$ also creates sets $T^V$ and $T^V_{corrupt}$ initialized to the emptyset, finally $C$ sends $v$ to $A$.

(2) CorruptVehicle($v$) : $C$ finds $(v, EC_V)$ in $V$ (if there is no pair in $V$ with first coordinate $v$ then $C$ does nothing) and returns $EC_V$ to $A$ and adds the pair to $V_{corrupt}$;

To FIG. 6B

FIG. 6A

From FIG. 6A (3) GetToken($v$) : C runs Algorithm 2 with input $v$ and receives a token $\tau$, and adds $\tau$ to the set $T^V$.

(4) CorruptToken(v) : C finds the token $\tau \in T^V$, adds it to the set $T^V_{corrupt}$ and sends it to the adversary.

(5) GetPC(v) : C searches a valid token $\tau \in T^V$ and runs the Algorithm 3 with input $(v, \tau)$. When it receives a PC, it adds it to the set $P^V$.

(6) ExposePC(v) The challenger selects a valid pseudonym certificate from the set $P^V$, adds it to $P^V_{corrupt}$, and sends it to $A$.

Challenge Queries: These queries indicate that the adversary is ready to break some facet of the scheme's security.

(1) Anonymity($v_0$, $v_1$) : C selects valid pseudonym certificates $P^{V}0$, $P^{V}1$ for the vehicles $v_0$, and $v_1$ respectively. It then chooses a bit $b$ at random from the set {0, 1} and sends $P^{V}b$ to $A$.

(2) Unlinkability($v_0$, $v_1$) : C selects valid pseudonym certificates from $P^{V}0$, $P^{V}1$ for the vehicles $v_0$, and $v_1$ respectively. C sends them to $A$. It then chooses a bit $b$ at random from the set {0, 1} and sends a different PC from the set $P^{V}b$ to $A$.

(3) Forgery($v$) : C selects pseudonym certificates from $P^V$ and sends them to the adversary A. These PCs are added to the set $P^V_{corrupt}$.

FIG. 6B

| Speed | Coverage Time (seconds) | | | |
|---|---|---|---|---|
| | Minimum | Median | Average | Maximum |
| 85mph | <0.1 | 1 | 1.39 | 5 |
| 75mph | 0.32 | 1 | 1.91 | 5 |
| 65mph | 0.61 | 2 | 2.07 | 6 |
| 55mph | 1 | 3 | 3.30 | 8 |
| 35mph | 3 | 6 | 5.75 | 10 |
| 25mph | 3 | 6 | 6.30 | 12 |

Table 1: Highway and in-city OBU-RSU coverage time.

FIG. 15

| | PCRL Size (MB) | |
|---|---|---|
| | Regular Revocation (1.29%) | Mass Revocation (5%) |
| Entire US | 176.4 | 683.6 |
| California | 19.9 | 77.3 |
| Texas | 14.7 | 56.9 |
| Florida | 11.4 | 44.1 |
| New York | 7.3 | 28.2 |
| Delta PCRL (weekly) | 3.4 | 13.1 |
| Delta PCRL (daily) | 0.49 | 1.87 |
| Local PCRL | 0.04 | 0.16 |

Table 2: PCRL types and sizes

FIG. 16

Algorithm 1 Setup ($sk_{CA}$)

1: Compute ($vk_V$, $sk_V$) ← G();

2: Compute $\sigma_V$ ← $Sign_{sk_{CA}}$ ($vk_V$)

3: $EC_V$ ← ($vk_V$, $\sigma_V$)

4: Output $EC_V$

FIG. 17

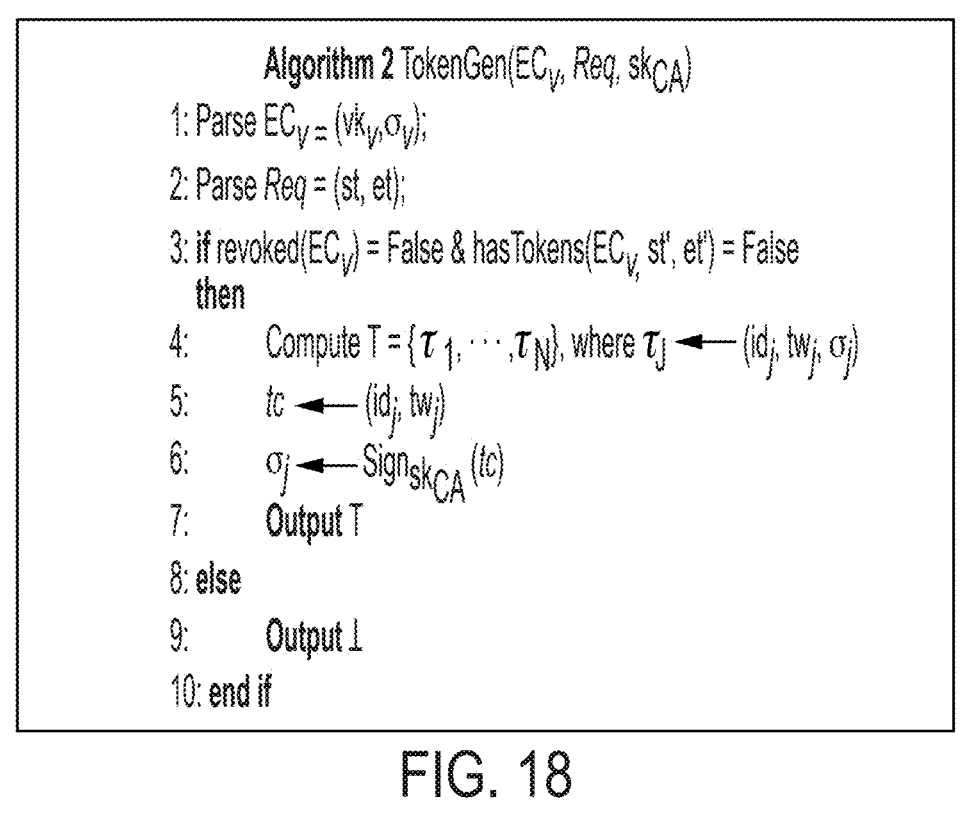

Algorithm 2 TokenGen($EC_V$, *Req*, $sk_{CA}$)

Parse $EC_V = (vk_V, \sigma_V)$;

Parse *Req* = (st, et);

if revoked($EC_V$) = False & hasTokens($EC_V$, st', et') = False then

Compute $T = \{\tau_1, \cdots, \tau_N\}$, where $\tau_j \leftarrow (id_j, tw_j, \sigma_j)$ $tc \leftarrow (id_j, tw_j)$ $\sigma_j \leftarrow \mathrm{Sign}_{sk_{CA}}(tc)$

Output T else

Output ⊥ end if

FIG. 18

Algorithm 3 PseudoGen($\tau$ , $sk_{RSU}$ , $vk_{CA}$)

1: Parse $\tau$ = (id, tw, $\sigma$)$_R$

2: Compute *(vk, sk)* G()

3: if timeValid($\tau$) = True & revoked($\tau$) =

4: Compute $\sigma'$ ⟵ $_{RSU}$Sign$_{sk}$ 5: Compute PC ⟵(vk, $\sigma'$) 6: Output PC 7: else

8: Output ⊥

9: end if

False & Verify$_{vk_{CA}}$ ((id, tw), $\sigma$) = True then

FIG. 19

Algorithm 4 Revoke(PC)

if decideRevoke(PC) = True then
    $\tau_j \leftarrow$ getToken(PC)
    $EC_V \leftarrow$ findLTC($\tau_j$)
    Update(BL, ECv)
    Update(TBL, $\{\tau_j, \cdots, \tau_N\}$)
    Update(PCRL, PC)
    Output (BL, TBL, PCRL)
end if

FIG. 20

TOKEN-BASED VEHICULAR SECURITY SYSTEM

FIELD

The present disclosure as directed to vehicle transportation systems, and more particularly to security in vehicle transportation systems.

BACKGROUND

Vehicle to vehicle (V2V) communication stands to improve the safety and efficiency of vehicle transportation systems. V2V communication also presents a unique set of security challenges. First, the revocation problem as a major pain point an these systems. Second, vehicles in current systems do not refresh their credentials often enough to avoid security issues. In current systems, credentials have a relatively long lifespan which opens the door for several types of attacks on the vehicle transportation systems. For these and other reasons, there is a need for the subject matter of the present disclosure.

SUMMARY

Consistent with the disclosed embodiments, a method of operating a token-based vehicular security system (TVSS) is disclosed. The method comprises communicating with a communicatively connected vehicle (CV) communicatively connected to the token based vehicular security system (TVSS). The method comprises issuing a pseudonym certificate (PC) to the communicatively connected vehicle (CV) from one of a plurality of roadside units (RSUs) with the token-based vehicular security system (TVSS) having a low latency. And the method comprises providing a standard unforgeability security guarantee for the token based vehicular security system (TVSS) without violating anonymity or unlinkability properties. In some embodiments, the method further comprises communicating with the communicatively connected vehicle (CV) moving at a speed of between about 25 miles per hour and about 85 miles per hour. In some embodiments, communicating with the communicatively connected vehicle (CV) communicatively connected to the token based vehicular security system (TVSS) comprises completing a transaction between one of the plurality of roadside units (RSUs) and the communicatively connected vehicle in less than about one-hundred milliseconds. In some embodiments, issuing the pseudonym certificate (PC) for the communicatively connected vehicle (CV) from one of the plurality of roadside units (RSUs) with the token-based vehicular security system (TVSS) having the low latency comprises issuing the pseudonym certificate (PC) for the communicatively connected vehicle (CV) from one of the plurality of roadside units (RSUs) with the token-based vehicular security system (TVSS) having the low latency of between about one millisecond and about two milliseconds. In some embodiments, the method further comprises receiving the pseudonym certificate (PC) at the communicatively connected vehicle (CV) from one of the plurality of road side units (RSUs) with a probability of success of between about 93% and about 99% with the communicatively connected vehicle moving at a speed of about 85 miles per hour. In some embodiments, the method further comprises updating the pseudonym certificate (PC) and maintaining an average time between updates of the pseudonym certificate of less than about eighteen minutes with about 20 miles between each of the plurality of roadside units.

Consistent with the disclosed embodiments, a method of operating a token-based vehicular security system (TVSS) is disclosed. The method comprises communicating with a communicatively connected vehicle (CV) communicatively connected to the token based vehicular security system. The method comprises sharing a short location-specific certificate revocation list (CRL) with the communicatively connected vehicle (CV). In some embodiments, sharing the short location-specific certificate revocation list (CRL) with the communicatively connected vehicle (CV) comprises sharing the short location-specific certificate revocation list (CRL) with the connected vehicle with no online involvement of the backend or communication back to the certificate authority. In some embodiments, the short location-specific certificate revocation list (CRL) is about 13 times smaller than a traditional certificate revocation list.

Consistent with the disclosed embodiments a token-based vehicular security system (TVSS) is disclosed. The TVSS comprises a roadside unit (RSU) communicatively connected to a roadside unit backend included in a cloud computing environment. The TVSS comprises a certificate authority (CA) included in the cloud computing environment, the certificate authority (CA) communicatively connected to the roadside unit backend. The TVSS comprises a SETUP protocol to enable a communicatively connected vehicle (CV), communicatively connected to the token based vehicular security system, to acquire a long-term enrollment certificate (EC) from the certificate authority (CA), the communicatively connected vehicle including an onboard unit capable of being communicatively connected to the roadside unit (RSU). The TVSS comprises a TOKENGEN protocol to enable the communicatively connected vehicle to acquire a plurality of authorization tokens from the certificate authority (CA). The TVSS comprises a PSEUDOGEN protocol to enable the communicatively connected vehicle (CV) to request a pseudonym certificate (PC) from the roadside unit (RSU) in exchange for one of the plurality of authorization tokens. The TVSS comprises a REVOKE protocol to enable the roadside unit backend and the certificate authority (CA) to cooperate to deactivate an adversarial vehicle credential. In some embodiments, the certificate authority (CA) and the roadside unit (RSU) meet an infrastructure/backend separation assumption. In some embodiments, the pseudonym certificate (PC) has a short lifespan. In some embodiments, the short lifespan is dynamically set based on a distance between roadside units (RSUs) and vehicle velocity. In some embodiments, the roadside unit (RSU) is connected to the roadside unit backend that communicates with but is distinct from the certificate authority (CA). In some embodiments, the PSEUDOGEN protocol is at least 7.6 times less likely to fail than a standard Security Certificate Management System for the communicatively connected vehicle (CV) having a velocity of 55 miles per hour. In some embodiments, the communicatively connected vehicle (CV) is operating in a particular geographical area and the communicatively connected vehicle (CV) receives an adversarial pseudonym certificate (PC) from the roadside unit (RSU) only for an adversarial vehicle operating in the particular geographical area.

BRIEF DESCRIPTION OF THE DRAWINGS

FIG. 4 shows a method for a VPKI Security Game in accordance with some embodiments of the present disclosure;

FIG. 5 shows Winning Conditions for an adversary in accordance with some embodiments of the present disclosure;

FIG. 6A and FIG. 6B show a flow diagram of a method for Initialization and Queries in accordance with some embodiments of the present disclosure;

FIG. 15 shows Table 1 disclosing highway and in-city OBU-RSU coverage time in accordance with some embodiments of the present disclosure;

FIG. 16 shows Table 2 disclosing PCRL types and sizes in accordance with some embodiments of the present disclosure;

FIG. 17 shows a flow diagram of a SETUP algorithmic method for a SETUP protocol in accordance with some embodiments of the present disclosure;

FIG. 18 shows a flow diagram of a TOKENGEN algorithmic method for a TOKENGEN protocol in accordance with some embodiments of the present disclosure;

FIG. 19 shows a flow diagram of a PSEUDOGEN algorithmic method for a PSEUDOGEN protocol in accordance with some embodiments of the present disclosure;

FIG. 20 shows a flow diagram of a REVOKE algorithmic method for a REVOKE protocol in accordance with some embodiments of the present disclosure;

DESCRIPTION

Figure 1:
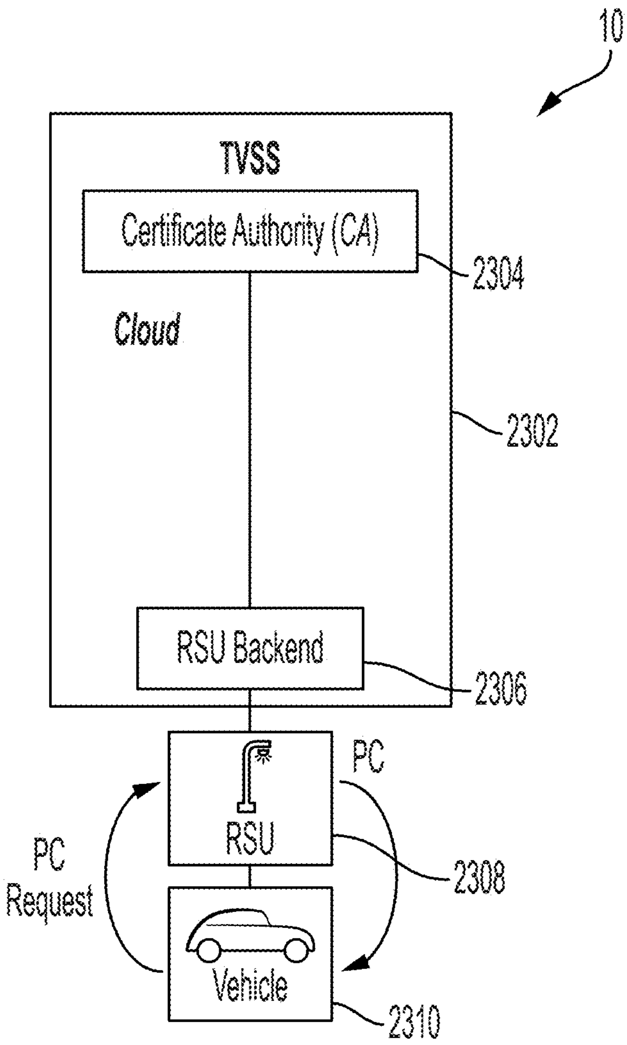
FIG. 1 shows a block diagram of a Token-based Vehicular Security System (TVSS) architecture in accordance with some embodiments of the present disclosure.

Reference will now be made in detail to the exemplary embodiments of the present disclosure described below and illustrated in the accompanying drawings. Wherever possible, the same reference numbers will be used throughout to refer to same or like parts.

While the present invention is described herein with reference to illustrative embodiments for particular applications, it should be understood that the invention is not limited thereto. Those having ordinary skill in the art and access to the teachings provided herein will recognize additional modifications, applications, embodiments, and substitution of equivalents, that all fall within the scope of the disclosure. Accordingly, the disclosure is not to be considered as limited by the foregoing or following descriptions.

Disclosed are solutions to the authentication problem for V2V communication systems which herein are called vehicular PKI (VPKI). TVSS, a new VPKI system, provides improvements over prior work in the area (including over SCMS; the US department of transportation standard for VPKI) by redesigning the system to take advantage of computation at the roadside units (RSUs) at the edge of the network. Unexpectedly, passing computation to the edge has several positive effects on security. First, it simplifies the revocation problem, a major pain point in prior systems. Second, giving compute power and function to the edge devices means vehicles interact more frequently with the system to refresh their credentials Field experiments of on-board units (OBUs) and RSUs show a reduced latency and lower communication compared to recent VPKIs. This results in the protocols of the disclosed methods and systems requiring a smaller window of connectivity with the RSU in order to complete successfully, and thus the disclosed protocols can be executed at higher vehicle speeds. Notably, the disclosed methods and systems are able to execute the bottleneck operation of the disclosed scheme with a stationary RSU while traveling at highway speeds (more than three times faster than the maximum speeds supported by SCMS). This turns out to have a significant positive impact on preserving vehicle privacy.

INTRODUCTION

Technology which allows road vehicles to communicate with one another and with pieces of road infrastructure has the potential to drastically improve the safety and efficiency of the transportation system. Indeed, though this technology is in its infancy, numerous products have already been proposed. Safety applications such as Basic Safety Messages are projected to reduce road fatalities by 80%, a decrease of roughly 30,000 per year. More than 50 intersections in Pittsburgh, PA were fitted with intelligent traffic signal control systems between 2012 to 2016, which reduced travel times through these intersections by 26% Coordinated driving applications such as Cooperative Adaptive Cruise Control allow connected vehicles to travel closely in a convoy/platoon, reducing aerodynamic drag, improving fuel efficiency, and lowering the carbon footprint of the entire transportation system by a projected 15%.

Security in these types of transportation applications is important as a breach could cause accidents or otherwise disrupt the flow of traffic. In the embodiments of systems disclosed herein, the authentication layer lying underneath these potential applications is considered. Designing such a system requires addressing some non-standard security issues having to do with the fact that a vehicle's identity and position over time are sensitive information.

Vehicular Public Key Infrastructure. Prior work on this topic has culminated in the Security Certificate Management System (SCMS) which has been adopted by the US Department of Transportation (a similar European standard has also been developed). These standards provide a public key infrastructure (PKI) for vehicles to use to authenticate themselves which promises a standard unforgeability security guarantee as well as two additional security features called anonymity and unlinkability. As used herein, anonymity means that a vehicle should be able to authenticate itself without revealing its long term vehicle identity; unlinkability demands that it should not be possible to identify the same vehicle authenticating itself in two different time periods. For example, if Alice's car authenticates itself today on highway 1, anonymity guarantees that no one can deduce "that car belongs to Alice", while unlinkability ensures that no one can say "the same car authenticated itself yesterday on highway 2". In the disclosure provided herein, we refer to a PKI which guarantees anonymity and unlinkability as vehicular PKI (VPKI).

Revocation. Given the damage potential of a malicious user in VPKI, a revocation mechanism is needed to deactivate a malicious user's credentials, rendering the user unable to participate in the system. Revocation solutions involving a global centralized certificate revocation list (CRL) are not ideal for VPKI. On the one hand, the large scale and distributed nature of the system make it unreasonable to expect that all vehicles would constantly maintain an up-to-date local copy of the CRL. On the other hand, network-based solutions where a vehicle queries a CRL on the cloud before interacting with another vehicle are not ideal because of latency and network intermittency. Because of these issues, revocation is a major pain point of all prior VPKI systems.

Pseudonym Certificate Generation Time. Typically in VPKI systems, users authenticate themselves on the road using temporary credentials called pseudonym certificates (PCs). These PCs are periodically refreshed when the vehicle executes the PC generation protocol with a stationary roadside unit (RSU). An important (and often overlooked) feature in the design of VPKIs is the execution time of PC generation as this governs the possible use cases of the system. Essentially, the issue is that a fast vehicle passing by an RSU would have only a very brief period of network connectivity (less than one second if traveling at highway speeds). Therefore, if the PC generation protocol is too slow, the vehicle and RSU will fail to complete their protocol with high probability, and thus the vehicle would not reliably be able to update its PC. This issue is aggravated by the fact that channel uncertainty in wireless networks intensifies in highly mobile environments. Unreliability of PC generation at high speeds means, for example, that cars might wind up using the same PC for hours at a time, which harms system security. Because of SCMS slow PC generation protocol, the results shown in this disclosure show that attempting to use SCMS in highway scenarios requires PCs to persist for 6.7 hours, while TVSS reduces this window to 18 minutes (a ~22.5× privacy improvement).

Features

Edge-based VPKI: Referring to FIG. 1, a Token-based Vehicular Security System (TVSS) 10, shown in FIG. 1, a new system architecture for VPKI with properties which are essential for a large scale mobile PKI system. The core novel feature of TVSS is that it takes advantage of the compute power of the network of roadside units (rather than using RSUs simply as a network of proxies connecting vehicles to the backend servers). Computationally able RSUs (such as RSU 2308) fit seamlessly into VPKI, yielding improvements across the board. Specifically:

1. Low latency PC generation: TVSS 10, (shown in FIG. 1) has a lightweight PC generation protocol including a handshake between the vehicle 2310 and an RSU 2308, as shown in FIG. 1. In particular, PC generation requires no online involvement from the RSU Backend 2306. This enables new use cases which were unsupported by previous systems (e.g., high speed PC generation).
2. Low Communication Revocation: Utilizing compute power of the RSUs (such as RSU 2308) enables reliable revocation where global CRLs are maintained by the (stationary) RSUs (such as PSU 2308), while only short (location specific) CRLs need to be shared with the vehicles. The result is that revocation in TVSS 10 requires less total communication than in prior systems.
3. Simple architecture: Passing computation to the RSUs (such as RSU 2308) simplifies the system as a whole. As shown in FIG. 1., the overall footprint of TVSS 10 is much smaller than that of SCMS. Thus, maintenance costs of TVSS would be lower with no loss to security.

Formalizing VPKI Security: A formal game-based security definition for VPKI incorporating unforgeability, anonymity and unlinkability is provided herein Additionally, other attacks on TVSS 10 and how to neutralize them are shown. A new type of attack called a clone attack which was previously unconsidered in the VPKI literature, and which affects all prior systems is disclosed. Clone attacks are similar to sybil attacks and occur when an authorized vehicle shares its credentials with an unauthorized vehicle in an attempt for both cars to participate in the system in different locations. Methods for handling cone at tacks against TVSS 10 are described. No discussion or defense to clone attacks is given in other VPKI systems.

Open Source Testbed: A testbed of on-board units (OBUs) and RSUs that have technical specifications similar to commercial OBUs and RSUs have been built. In particular, a networking standard specifically designed for connected vehicles, IEEE 802.11p for dedicated short range communication, is included in the testbed.

VPKI Implementation and Field Experiments: TVSS 2300 and other VPKI systems have been implemented on the OBUs and RSUs and the testbed systems have been used to conduct a series of highway and in city street experiments at different velocities ranging from 25 mph to 85 mph. The tests showed that TVSS 2300 achieves a 28.5× reduction in its PC generation latency and a 13× reduction in total communication during revocation compared to other systems. At extreme speeds, TVSS is 3.85× more likely to successfully complete PC generation and 6.5× more likely to successfully update its local CRL compared to other systems.

System Overview

Here, the disclosure explains how TVSS 10 works at a high level and how the three features described above are achieved. A more detailed description is presented in the next section.

System Players and the Parameter T. The main players in TVSS 10 are the vehicles 2310, the distributed network of RSUs 2308 and the certificate authority (CA) 2304. The RSUs 2308 are all connected to a backend server called the "RSU backend" 2306 which communicates with, but is distinct from the CA 2304 (this is important for revocation). The connection between the vehicles 2310 and the RSUs 2308 is modeled as a secure private channel (this will be implemented using encryption). Time in TVSS 10 is broken into distinct periods of T minutes each, for a system parameter T. Smaller T means stronger security and greater overhead on the system.

The Infrastructure/Backend Separation Assumption. It is important to security in TVSS 10 to assume that the CA 2304 and the RSUs 2308 are controlled by separate entities which do not collude; this is called the infrastructure/backend separation assumption. Some version of this assumption is implicit an all prior work on VPKI. Though not ideal, the infrastructure/backend separation assumption necessary for security in TVSS 10 is plausible since the CA 2304 would likely be controlled by a specialized security company while the RSUs 2308 would be part of the public infrastructure. Public infrastructure includes street light systems, power delivery systems, traffic signs, and any other structures encountered in a traffic system on which RSUs 2308 my be mounted or included.

System Setup. Life begins for a vehicle 2310 when the vehicle 2310 obtains an enrollment certificate EC from the CA 2304. In some embodiments, this occurs at the manufacturing plant, once during the vehicle's lifetime. FIG. 17 shows a flow diagram of a SETUP algorithmic method for a SETUP protocol in accordance with some embodiments of the present disclosure.

Token Generation. Once a vehicle 2310 possesses an enrollment certificate, the vehicle 2310 can request a batch of tokens from the CA 2304 which the vehicle 2310 will later trade in to the RSUs 2308 in order to get PCs. In order to request tokens, the vehicle 2310 authenticates itself using the EC in order to receive a large number of tokens (say 2,880 for a one month's supply when T=15 minutes). Each token is signed using a CA's 2304 private signing key and can be validated by verifying the signature using a CA's 2304 public signing key. Each token is valid for one specified period of T minutes; when the final token expires, v will need to request new tokens from a CA 2304. Token generation can be performed offline. FIG. 18 shows a flow diagram of a TOKENGEN algorithmic method for a TOKENGEN protocol in accordance with some embodiments of the present disclosure.

PC Provisioning. Once a vehicle 2310 has tokens, it can request PCs from any RSU 2308. To do this, the vehicle 2310 presents the token for the current time period to the RSU 2308 and the RSU 2308 verifies authenticity against the CA's 2304 public credentials and, if valid, returns a PC The PC is signed by the RSU 2308 and marked with a geographical tag corresponding to the RSU's location and is valid only when nearby this location and during the same time window that the token is valid for. This means that new PCs must be requested every T minutes. The geographic radius of validity should be an upper bound on the distance one can drive in T minutes. The RSU 2308 sends the received token to the RSU backend 2306 to check for duplicates. If the same token is used twice to generate two different PCs in two different geographical areas (i.e., if a clone attack is being launched), then the RSU backend 2306 will notice and will begin the revocation procedure (described below) for this vehicle 23101.

Notice that from the point of view of the vehicle 2310, PC generation consists of a sample "handshake-type" interaction with the RSU 2308. This is in contrast to SCMS where PC generation requires the vehicle's messages to be forwarded all the way to the RSU backend 2306 which is four "network hops" away from the vehicle. The ability to perform PC generation over a short-term connection unlocks use cases which are not supported by SCMS. For example, experiments described below demonstrate that PC generation in TVSS 10 can be performed at high speeds on the freeway, while this would not be possible in SCMS. Indeed, the experiments indicate that in these driving conditions, the PC generation protocol is at least 10× less likely to fail than PC generation in SCMS. This is an important improvement since resolving the issues resulting from failed PC generation attempts consumes extra system resources. Additionally, because PC generation can be performed with a much weaker connection between the vehicle 2310 and an RSU 2308, the frequency with which a connection occurs which can support PC generation increases considerably. This allows the system to be set up so that PCs are refreshed more frequently (every fifteen minutes, rather than once per week) which translates to better security and easier revocation. FIG. 19 shows a flow diagram of a PSEUDOGEN algorithmic method for a PSEUDOGEN protocol in accordance with some embodiments of the present disclosure.

Revocation. When the PC of a malicious vehicle 2310 as identified, the RSU backend 2306 and the CA 2304 are alerted, and they cooperate to recover the current and future tokens of the offending vehicle 2310. These tokens are shared with the RSUs 2308 who update their token blacklists (TBLs), thus preventing the offending vehicle from obtaining any new PCs an the future. In order to deactivate the current PC, the CA 2301 shares the offending PC only with the RSUs 2308 which are in the geographic radius of the misbehaving vehicle, these RSUs 2308 in turn share the PC with all vehicles 2310 in their region, who update their local CRL (or what we also refer to as pseudonym certificate revocation lists, PCRLs) and make sure to avoid the offending vehicle.

Note that the honest vehicles 2310 receive only the PCs of the misbehaving cars in their geographical area, not the list of all misbehaving vehicles in the whole system. Moreover, this list must only be maintained for the remainder of the time period, after which point it can be discarded. Thus, the amount of revocation information which needs to be downloaded by each vehicle is small. The large TBLs which must be maintained by the RSUs 2308 (consisting of all current and future tokens of all offending vehicles in the system) represent less of a problem as the RSUs 2310 are stationary and so should have a stable connection. Experiments described below demonstrate that this change to requiring the vehicles 2310 only to maintain a geographically based CRLs leads to a systemwide 13× savings in total communication size.

While the idea of using geographic PCs to improve revocation seems, at first glance, to be a generic solution which can be applied in any VPKI, this is not the case. A key feature of TVSS 10 which makes at possible is the short lifespan of the PCs (i.e., small T). In SCMS, the PCs are live for an entire week and so it is not possible to constrain a PC to a small geographic region (one week as enough time to drive from Lisbon, Portugal to Vladivostok, Russia). The short lifespan of PCs is only possible in TVSS 10 because of the system-wide efficiency improvements gained by passing computation to the RSUs 2308. FIG. 20 shows a flow diagram of a REVOKE algorithmic method for a REVOKE protocol in accordance with some embodiments of the present disclosure.

Security. Anonymity and unlinkability both hold in TVSS 10 intuitively because the tokens which are used to get the PCs have no information about the vehicle 2310. For example, even if the RSU 2308 is corrupt and can connect the PC to the token, there as no way to connect the token to the vehicle's 2310 enrollment certificate as long as the RSU 2308 does not collude with the CA 2304. Thus, anonymity should hold under the infrastructure/backend separation assumption; unlinkability should hold for similar reasons. Formal security definitions and proofs are provided below.

TVSS System

Below, the system model and assumptions are disclosed. In addition, the detailed protocols of TVSS 10 (Setup 2312, TokenGen 2314, PseudoGen 2318, Revoke 2316) and implementation considerations are disclosed.

System Model and Assumptions

Figure 2:
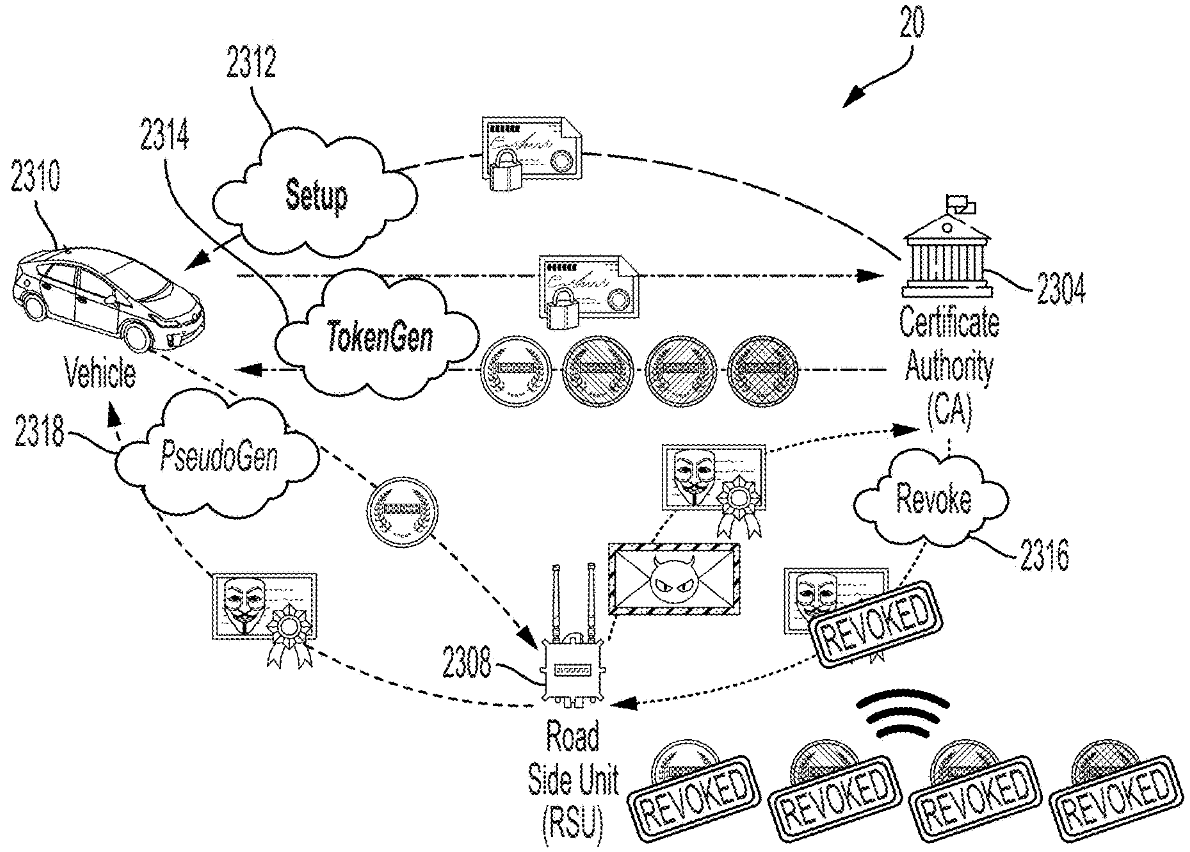
FIG. 2 shows an illustration of an overview of TVSS protocols in accordance with some embodiments of the present disclosure.

As mentioned before, TVSS 10 consists of a network of RSUs 2308 and backend servers residing in the cloud. The backend servers are the RSU backend 2306 and the certificate authority (CA) 2304. The CA 2304 is the root of trust in the VPKI and it is responsible for providing vehicles 2310 with ECs and tokens while providing RSUs 2308 with signing certificates. Vehicles 2310 use ECs to obtain tokens from the CA 2304 while RSUs 2308 use their signing certificates to generate and sign PCs for vehicles 2310 in exchange for tokens, as shown in FIG. 2. FIG. 2 shows an illustration of an overview of TVSS protocols 20 in accordance with some embodiments of the present disclosure. Vehicles use dedicated short range communication (DSRC/IEEE 802.11p) to communicate with one another, and they can reach the internet and the backend servers through the RSUs 2308 only. The communication channels between system's entities (i.e. vehicles 2310, RSUs 2308, backend servers, etc) are assumed to be always secure (e.g., over TLS) The system protocols described next make use of a standard digital signature scheme.

System Protocols

The four protocols (Setup 2312, TokenGen 2314, PseudoGen 2318, Revoke 2316) are included in TVSS 10.

Setup 2312: This allows a vehicle v∈V to acquire a long-term enrollment certificate, ECv, which acts as the vehicle identity. Explicitly ECv is a signing key pair consisting of a private signing key and a public verification key, and additionally a signature on the public verification key using the CA's 2304 private signing key. The vehicle v will use ECv to request services from the CA 2304 when needed using a TLS-style handshake. The enrollment certificate ECv has a long expiration time and v probably gets it once in its lifetime or upon ownership transfer. FIG. 2 shows an overview of this protocol, the full protocol is given in Algorithm 1.

TokenGen 2314: This provides a vehicle 2310 with a list of authorization tokens T={τ1, . . . , τN} that can be used to anonymously request pseudonym certificates from the RSUs 2308. Each token τ∈T is active during a specified time window only, and so once the final token in T expires, the vehicle will have to rerun this procedure to get more. Explicitly, each token is a random nonce, a time window, and a signature on the nonce/tame window pair. The vehicle 2310 obtains the tokens after completing a TLS-style handshake with the CA 2304 using ECv. FIG. 2 shows an overview of TokenGen 2314, and Algorithm 2 shows the full protocol.

PseudoGen 2318: This is used by vehicles to request PCs from the RSUs 2310 in exchange for tokens. Explicitly, a PC as a signing key pair consisting of a private signing key (generated by the vehicle and kept secret), and a public verification key, and a signature on the public verification key using the RSU's 2308 secret signing key. The vehicle 2310 simply presents its token and its verification key to the RSU 2308 who validates the token and then signs the verification key and returns the PC. The RSU 2308 also shares this token and the certificate with the RSU backend 2306 to detect if token double use occurs; this allows the system to detect and throttle clone attacks. FIG. 2 shows an overview of PseudoGen 2318, the full protocol is shown in Algorithm 3.

Revoke 2316: When a vehicle 2310 is identified as adversarial, the RSU backend 2306 and the CA 2304 cooperate to run this protocol to deactivate the offending vehicle's credentials. This works, as described above, by updating the RSU TBLs to include all future tokens of the offending vehicle 2310, by updating the vehicle CRLs of all vehicles 2310 which are nearby the offending vehicle 2310 to include the malicious PC, and by updating the CA blacklist (BL) to include the enrollment certificate (ECv). FIG. 2 shows an overview of Revoke 2316; the full protocol is in Algorithm 4.

Implementation Considerations

RSU Blackout Areas. Suppose a vehicle 2310 needs to travel to an area with limited RSU 2308 deployment for an extended period, but wants to precompute PCs for use during its trip. Normally the RSUs 2308 in the system will only give a PC for the current time window. However, in such a situation, the system could allow an RSU 2308 to grant a batch of PCs in exchange for a batch of tokens and the vehicle 2310 would be able to authenticate itself as usual. Note however that the unlinkability guarantee would fail to hold as the RSU 2308 would likely infer that the batch of PCs all belong to the same vehicle.

Linked Tokens via Hash Chains. A novel approach is described that allows for generating token ids for a single vehicle 2310 v that look random and independent but can still be selectively linked using a secret that is kept at CA 2304 only. Particularly, this approach provides two advantages: 1) It allows CA 2304 to publish a single τ id (and a secret) per revoked v, which can significantly reduce token blacklist (TBL) bandwidth requirements since the TBL size becomes based on the number of revoked vehicles rather than revoked tokens. 2) The CA 2304 can keep a single T id (and a secret) at any tame window and derive the ids of tokens of future time intervals; the same approach can also be utilized by an RSU 2308 when tokens are revoked. This can significantly reduce the storage requirements of keeping such token ids at CA 2304 and RSU 2308.

Figure 3:
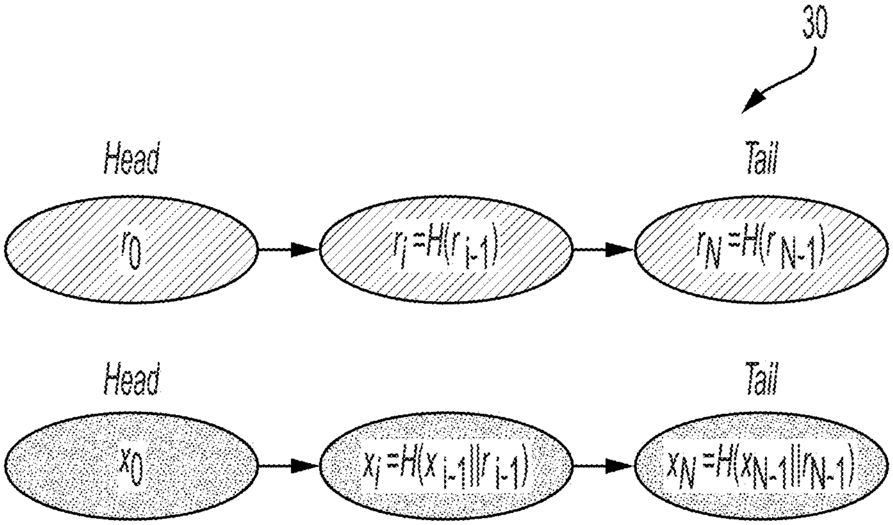
FIG. 3 shows an illustration of a hash chain mechanism in accordance with some embodiments of the present disclosure.

FIG. 3 shows an illustration of a hash chain mechanism 30 in accordance with some embodiments of the present disclosure. Before explaining this hash chain approach, as shown in FIG. 3, the intuition behind the hash chain approach is described. The approach utilizes hash chains because each hash value of the hash chains look random and thus can be used as a τ id. However, since the hash function H is public, RSU 2308 can determine if two hashes xi, xj belong to the same chain by using one to derive the other using H, which violates unlinkability. To fix this issue, CA 2304 uses a per vehicle secret r as part of the H input to traverse the $\tau$ id hash chain of v; thus, RSU 2308 is unable to link $\tau$ ids without knowledge of r due to the inversion hardness assumption of H. Additionally, upon revocation and revealing the secret r, the mechanism needs to preserve unlinkability of v before it was revoked (e.g., protect privacy of a stolen v). To achieve this property, the per vehicle 2310 secret r is also constructed as another hash chain as shown in FIG. 3; thus, when v is revoked at a time interval, only corresponding hash values from both hash chains are revealed, which only allow RSU 2308 to derive current and future revoked tokens of v.

The hash chain mechanism works as follows: At vehicle Setup 2312, CA 2304 picks two random values, $x_0$,$r_0$, called heads. Upon executing PseudoGen 2318, CA 2304 uses H and the heads $x_0$,$r_0$ to create two hash chains of length N+1, where N is the number of tokens generated as a result of this request: the next PseudoGen 2318 request heads become xN, rN. In the hash chain of secrets (i.e., r0, . . . , rN), at the $i^{th}$ position, the value is calculated by H (ri−1). The second hash chain, which produces the $\tau$ ids, makes use of the values from the first chain. Specifically, the value at the $i^{th}$ position is calculated by applying H (xi−1||ri−1). Whenever a malicious vehicle is detected, then the remaining tokens are revoked by publishing the corresponding input values to the current token xi being revoked, that is, (xi−1, ri−1). With this, the RSU 2308 will be able to invalidate the other remaining tokens acquired by the revoked v, which allows RSU to detect and refuse providing new PCs to revoked vehicles 2310.

Security

Below, the security of TVSS 10 is disclosed. Sybil and clone attacks considered. A formal game-based security definition for VPKI which captures anonymity and unlinkability is described. Then, the proposition that TVSS 10 satisfies the security definition as proven.

Sybil and Clone Attacks

Sybil Attacks. A Sybil attack occurs when a single malicious vehicle 2310 impersonates many independent vehicles 2310. Sybil attacks are a major concern an SCMS as the vehicles 2310 are given many valid PCs simultaneously and instructed, but not forced, to use them one at a time. However, in TVSS 10 vehicles 2310 get only one valid PC at a time and so a Sybil attack is only possible if the malicious vehicle obtains (either consensually or illicitly) active PCs from other actual users. Thus, launching a Sybil attack on TVSS 10 is much more difficult than on SCMS since it requires either convincing several other users to misbehave, or it requires obtaining their credentials via some other means. In this case, if the Sybil attack were noticed, the offending vehicle's 2310 credentials would be revoked, along with the credentials of all vehicles whose PCs were used.

Clone Attacks. A clone attack occurs when a malicious vehicle 2310 shares its token with another vehicle 2310 in another geographic area and both of them use the token to obtain a valid PC and participate in the system. Clone attacks are more problematic for our system since there is nothing tying the token to the vehicle 2310, and so there is no way for the second RSU 2308 to notice that the token does not "belong" to the clone vehicle. However, when the RSUs 2308 send the tokens to the RSU backend 2306 for analysis, the RSU backend 2306 will discover the clone attack since it will notice that the same token was used in two different places. Immediate revocation will follow, and so the next time the offending vehicle 2310 tries to get a PC from a RSU 2308, it will find that its tokens no longer work.

VPKI Security

In this section, the security notions of anonymity and unlink ability are formalized for a VPKI system using a game-based security definition.

Security Game Overview. Let (Setup 2312, TokenGen 2314, PseudoGen 2318) be the algorithms from a TVSS 10 system (the Revoke 2316 procedure plays no part in this game), and furthermore let (Sign, Verify) be the sign and verify algorithms for the signature scheme used in the VPKI (recall that the PCs consist of a signature key pair and a signature on the public key using the RSU's 2308 secret key). In the security game, the adversary (A) is given full control of all parties in the system: A can create vehicles 2310 using Setup 2312. A can request tokens/PCs as v using TokenGen 2314/PseudoGen 2318 which A can choose to either expose or not. Eventually A decides how it will attempt to win the game; A has three options. A can win via forgery. A can break anonymity, or A can break unlinkability. The challenger C then issues a corresponding challenge to A, and A attempts to wan the game. For example, if A decides it wants to win via anonymity, then A will specify two different vehicles and C will have a PC of one of them and A must guess to which vehicle the PC belongs. The security game 40 is shown in FIG. 4 and the full set of legal queries and winning conditions are shown in FIG. 6A, FIG. 6B, and FIG. 5.

Definition 1 says that the VPKI scheme is secure if no efficient adversary can wan with any non-negligible advantage. Note that A can trivially win the anonymity or unlinkability version of the game by guessing randomly, therefore advantage in this case means Pr [A winsf −½, while in the forgery version of the game A's advantage is simply Pr [A winsf].

Definition 1. A VPKI scheme is secure, if for all efficient adversaries A, A's advantage in winning the VPKI security game is negligible.

A thorough proof that the proposed scheme, TVSS 10, is secure is provided below. A security reduction for all the three challenges: forgery, anonymity, and unlinkability as provided.

Experimental Testbed

Figure 7A:
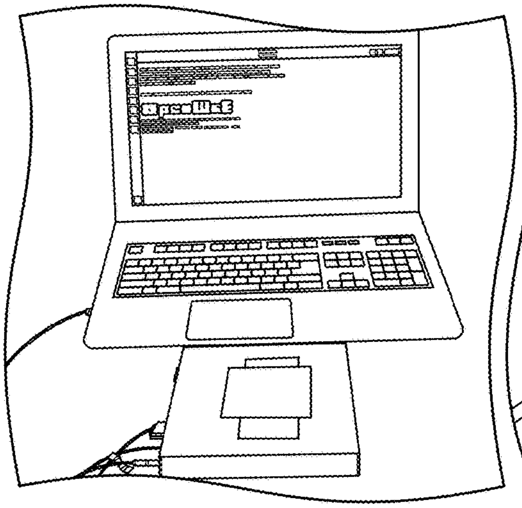
FIG. 7A shows an illustration of an OBU controlled by a laptop in a highway test in accordance with some embodiments of the present disclosure.
Figure 7B:
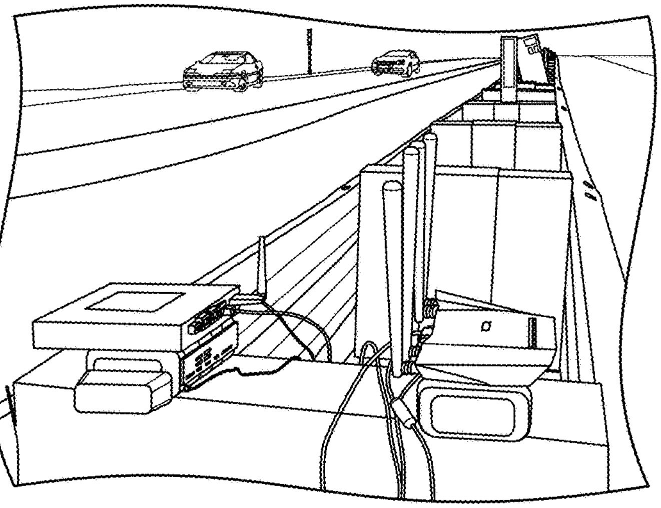
FIG. 7B shows an illustration of an RSU connected to a cellular router in a highway test in accordance with some embodiments of the present disclosure.

In this section, the hardware used for our experiments is presented. Technical details on the connected vehicles 2310 networking technology IEEE 802.11p/DSRC setup is provided implementation details and issues when conducting experiments on connected vehicles 2310 is described. Finally the design of the field experiments on connected vehicles is explained; FIG. 7B shows a snapshot of the highway testbed.

Hardware

Five PC Engine APU1D4 embedded devices that can act as either on-board units (OBUs) or road-side units (RSUs) 2308 were obtained. APU1D4 devices are chosen to have technical specifications that are similar to commercial OBUs and RSUs 2308 shipped by well-known vendors like Commsignia (ITS-OB4 OBU and ITS-RS4 RSU) and Savari (MW-1000 OBU and SW-1000 RSU). Each of the PC Engine APU1D4 devices has an AMD G series T40E-1 GHz dual Bobcat core, 4 GB DDR3-1066 DRAM and a 16 GB SSD hard drive. The APU104 based OBUs and RSUs were built from scratch so that they provide an open source environment where various applications/VPKI protocols can be implemented to get real field measurements of their performance in a vehicular environment. The OBUs and RSUs 2308 run on a patched version of OpenWrt 21.02.1, a well-known firmware mainly used with embedded and networking devices and is utilized by Savari commercial OBUs and RSUs 2308.

Moreover, two cloud servers were setup at a well-known cloud provider, Digital Ocean, acting as the certificate authority (CA) 2304 and registration authority (RA), which are needed by alternative cloud-based VPKI systems. Each of the CA 2304 and RA runs on an independent server with 4 CPUs, 8 GB of DDR3 RAM and 160 GB of SSD hard drive. Cudy N300 routers were also obtained. The routers are equipped with LTE SIM cards from a cellular service provider; RSUs 2308 are connected to cellular routers to enable internet connectivity. Whenever OBUs need to reach the internet (e.g., for CA 2304 access, RA access . . . etc.), they make use of RSUs 2308 to relay their requests to the cellular router.

IEEE 802.11p/DSRC Setup

In order to enable the OBUs and RSUs 2308 to use the networking standard IEEE 802.11p (DSRC) which is specifically designed for automotive communication, UNEX DHXA-222 wireless network interface cards (NICs) were installed. The installed NICs are compatible with IEEE 802.11p/DSRC. These NICs have been validated and proven to deliver reliable IEEE 802.11p/DSRC communication. To have IEEE 802.11p/DSRC properly set up, the NICs are configured to use the Outside Context of a BSS (OCB) mode; this allows direct communication between OBUs and RSUs 2308 (i.e., V2I/V2V) in an instant fashion with no association/authentication handshakes needed at the link layer. The vehicular standard 5.9 GHz frequency band is also used with a channel width of 10 MHz (namely, channel 178 at 5.890 GHz) as specified by the standard. While the NICs allow the bit rates of 3-27 Mbps to be set, the testbed is configured to have the baseline standard DSRC bit rate of 6 Mbps. IEEE 802.11p compatible antennas from Mobile-Mark (for OBUs) and PulseLarsen (for RSUs) are used with the transmission power set to 15 dBm.

Implementation

Bash scripts that utilize the ICMP protocol were developed in order to determine the contact time between OBUs and RSUs 2308 when CVs 2310 pass by RSUs 2308. Python was used to implement 3 VPKI systems to measure their performance, namely 1) TVSS 10, 2) SECMACE, a recent VPKI system, and 3) SCMS, the US VPKI standard.

In SCMS, an OBU can request a fresh PC only from the cloud. In SECMACE, the OBU requests tickets from the cloud. Then the 08U uses these tickets to obtain fresh PCs from a Pseudonym Certificate Authority (PCA). Note that in SECMACE, it is assumed the PCA is in the cloud as well, but in order to perform a fair comparison between SECMACE and TVSS 10, it was decided to place the implementation of PCA for SECMACE inside the RSUs. 2308. In TVSS 10, the OBU requests tokens from the cloud 2302 and uses these tokens to obtain fresh PCs from the RSUs 2308. The PC in both SECMACE and TVSS 10 is valid only within a specific region but the main difference is that when a vehicle leaves the validity region in SECMACE, the OBU must request new tickets from the cloud, while in TVSS the OBU simply uses a token to request a new PC from the RSU 2308 for the new region.

In all of the cloud based VPKIs, any interaction with the cloud must go through an RSU 2308. Each RSU 2308 is equipped with a switching and a routing fabric and configured with a routing table to quickly and efficiently forward any OBU request to a cloud-based IP address via the connected 4G gateway (see below, and FIG. 7A) Note that from an OBU point-of-view, the RSU 2308 is the gateway to the cloud servers 2302. In addition, all communications between OBUs, RSUs 2308 and cloud servers use reliable and secure channels TCP/TLS1.3, and for that the mainstream Python libraries socket and ssl are utilized. In addition, hashlib library is used for hashing using SHA256.

For public key cryptography, we utilize PyNaCl, a Python binding to libsodium, which is a fork of the Networking and Cryptography library (NaCl). The library is used to implement public key encryption using the Elliptic Curve Integrated Encryption Scheme (ECIES) algorithm with the curve25519 elliptic curve and EdDSA digital signature algorithm with the ed25519 elliptic curve. Both algorithms use 256-bit long private keys and are adopted by SCMS All VPKI components (OBU, RSU 2308, CA 2304 and RA) use certificates for authentication.

The nature of experimenting on fast moving vehicles makes the contact time between OBUs and RSUs 2308 (i.e., gateways) limited as will be shown below. Initially, difficulties were experienced measuring cloud-based VPKI systems accurately since the systems tend to have longer round trip time (RTTs) and OBUs could try to communicate with cloud 2302 by sending a packet just before contact is made with the RSU 2308 and wait till after it is out of coverage. This issue by letting OBUs periodically create a new independent thread and send a new request to the cloud servers. The timeout is set to 30 ms for OBU-RSU communication and 2 s for OBU-cloud communication; a new request thread as created every 500 ms to make sure VPKIs have a chance to make a request while in contact with the RSU 2308 and to not saturate the receivers.

Experimental Scenarios

All three VPKI systems were evaluated under the following scenarios: 1) highway and 2) in-city scenarios. For the highway scenario, the highway has four lanes (two are inbound and the other two are outbound) and a median strip in the middle. One OBU is installed in a vehicle and four RSUs 2308 are placed on the median strip (i.e., middle of highway). The vehicle passes by the four geographically distributed RSUs 2308 at various highway speeds ranging from 55 mph to 85 mph. For the in-city scenario, the street has two opposing lanes with no median strip; one OBU is installed in the vehicle and four RSUs 2308 are placed on the side of the street. The vehicle passes by the four geographically distributed RSUs 2308 at relatively slow speeds, namely 25 mph and 35 mph. In both scenarios, RSUs 2308 do not have overlapping coverage and are connected to cellular routers, and the OBU antenna is placed outside the vehicle for better signal transmission and reception. In each scenario, two sets of experiments were conducted, PC Procurement (obtaining a PC from the VPKI) and PCRL Download (retrieve a complete and up-to-date PCRL from the RSU 2308). For each experiment and each speed, the experiment was run and repeat the experiment 25 times which generate 100 results per run (25 trials×4 RSUs).

Evaluation

In this section, a field-based study of TVSS 10 is presented along with the two alternatives (SECMACE and SCMS) using the measurements collected by the testbed of OBUs, RSUs, and cloud servers on highway and in-city streets at a range of driving velocities as described above. As described above, TVSS 10 is edge-based, pushing primary services to the edge of the network (the RSU 2308) to enable operation compatible with potentially short connection times. As a result, communicating with centralized back-end services during critical operations is avoided, thus shortening response time and increasing the reliability of the offered services. A primary advantage of TVSS 10 in a V2I communication setting, is that TVSS 10 enables anonymized reauthentication of connected vehicles (CVs) 2310 as they drive by RSJs 2308. A CV 2310 may have access to the infrastructure services for a short period of time (depending on its speed, range, and location) before it exists the coverage of the serving RSU 2308. The purpose of the experiments is to measure the effect of the network coverage time on the service performance and achieved security for different traveling speeds. The scalability of actual RSUs 2308 is also discussed. For all VPKIs, 100 field samples were collected for each of the experiments in order to get statistically reasonable results. Next, evaluation campaigns are presented; each campaign evaluates a specific metric in the design of the VPKIs.

Evaluation 1: Measuring Basic Coverage Times. In the first evaluation, we aim to capture the time a vehicle stays in the cover-age of an RSU 2308 under different speeds and directions to study the implications of vehicle network connectivity time on VPKI. The results are presented in Table 1 in FIG. 15. As can be seen in FIG. 15, in a worst-case scenario, for a vehicle 2310 traveling at a high speed (85 mph) that passes by an RSU 2308 from the outer region of its coverage area (i.e. far away from the RSU 2308), the coverage time can be lower than 100 ms. Our results also show that vehicles 2310 driving on the highway (55 mph-85 mph) have coverage time with the RSU ranging from 1.39 s to 3.30 s, which is very limited. This suggests that all communications with the RSU 2308 need to be completed in a very short period before vehicles are out of coverage. Furthermore, the operations that require the backend/cloud involvement require the link between the RSU 2308 and backend servers to always be reliable, which might be infeasible in vehicular environments (e.g., RSU 2308 might have to rely on an unstable wireless service, with only intermittent connectivity) In addition, Table 1 measures the coverage times for vehicles 2310 driving inside the city at relatively slow speeds (25 mph-35 mph). While vehicles 2310 have more contact time with RSUs (5.75 s to 6.30 s) 2308 in the city, the results show that there are cases where contact time can be limited (as low as 3 s). This is an expected outcome in realistic testbeds as the conditions of wireless channels fluctuate in dynamic environments such as vehicular networks.

Figure 8:
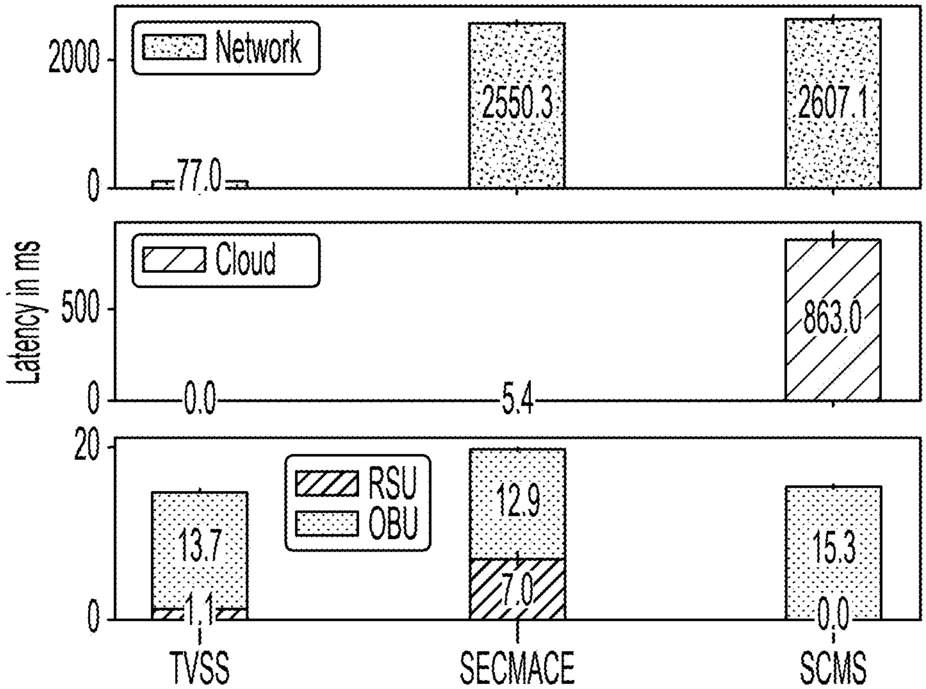
FIG. 8 shows graphs of PC generation latency of VPKI systems in accordance with some embodiments of the present disclosure.

Evaluation 2: PC Generation Latency. In order to get a better understanding of the design implications of VPKI systems, the end-to-end latency of a PC request operation using different VPKI designs was measured; TVSS 10, our proposed VPKI system, SEC-MACE, a recent VPKI system, and SCMS, the US VPKI standard. For PC generation. TVSS 10 completely relies on the RSU 2308 while SECMACE relies on both the RSU 2308 and a cloud-based CA 2304. For SCMS, it relies completely on the cloud servers. FIG. 8 shows graphs of PC generation latency of VPKI systems in accordance with some embodiments of the present disclosure. In more detail, FIG. 8 presents the elapsed time at the OBU, RSU, network and cloud servers for completing a single PC generation request. For all VPKI protocols, the most dominating factor as the network time. The results show that relying completely on the edge for refreshing PCs, as in TVSS 10, helps cut down network latency by 33.5× compared to relying on the cloud. Thus, these results show that TVSS 10 reduces total PC generation latency by 28.5× and 38.5× compared to SECMACE and SCMS, respectively. FIG. 8 additionally indicates that RSU overhead is reduced by 6.4× in TVSS 10 compared to SECMACE; this has bad implications on the scalability of RSUs 2308 for SECMACE as will be discussed later in this section. Even though SECMACE PC generation cannot rely completely on the edge for security reasons, TVSS 10 cuts down the combined edge overhead (OBU and RSU) by 1.36× compared to SECMACE. This implies that TVSS 10 is a more efficient solution compared to its alternatives.

Figure 9:
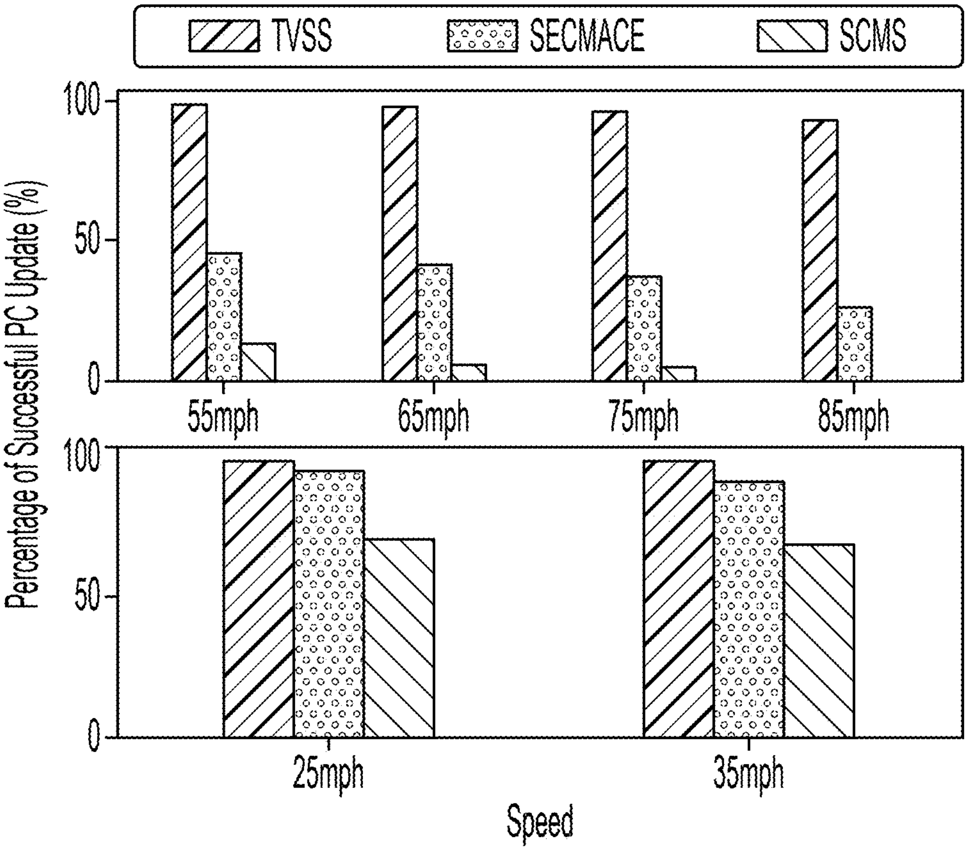
FIG. 9 shows graphs of success ratio of vehicles refreshing a PC via all VP-KIs under highway speeds (top) and in-city speeds (bottom) in accordance with some embodiments of the present disclosure.

Evaluation 3: PC Renewal Success Ratio. In this evaluation, we want to measure the ability of various VPKI systems to issue a PC under the constraint of a vehicle 10 coverage time when it drives by an RSU 2308. The three VPKIs are tested under two scenarios: 1) highways with speeds of 55 mph-85 mph and 2) in-city with speeds of 25 mph-35 mph. The results are reported in FIG. 9 (top). From FIG. 9, it is clear that for the case of a regular highway speed of 55 mph, PC refreshes can be completed successfully with a ratio of 99% for TVSS 10, 46% for SECMACE and 13% for SCMS; this means that TVSS 10 achieves 2.15× and 7.62× better reliability compared to SECMACE and the standard VPKI SCMS, respectively. For the worst case of a CV 2310 driving on the highway at 85 mph, PC refresh success ratio are 93% for TVSS 10 and 26% for SECMACE. For SCMS, however, it was unable to refresh PCs at such small RSU-OBU contact time. This shows that TVSS 10 improves performance over SECMACE by 3.58× and is reliable under such harsh conditions. Furthermore, all VPKI protocols were tested on a city street under low speeds (i.e., in-city speeds), namely 25 mph and 35 mph, and show their PC issuance success ratio in FIG. 9 (bottom). The results show that when vehicles 2310 are driving at 25 mph, the PC generation success ratios are 99% for TVSS 10, 95% for SECMACE and 71% for SCMS While TVSS 10 outperforms SECMACE and SCMS, it is clear that cloud-based VPKI protocols are acceptable for slow moving vehicles but not for fast velocities at highways, which usually constitute most of the vehicle's 2310 trip. One can see that SECMACE and SCMS have a difference in their performance although both rely on the cloud; this is because SECMACE has a more efficient design and divides the work needed to issue a new PC between the cloud and an RSU while SCMS completely relies on the cloud. TVSS 10, on the other hand, utilizes minimal cryptographic operations for the PC generation issuance process and moves it completely to the edge (i.e., RSU 2308), which allows for this improvement.

Evaluation 4: PCRL Size. In this evaluation, the feasibility of pseudonym certificate revocation lists (PCRLs) used in TVSS and other VPKI systems is discussed. PCRLs hold pseudonym identities of revoked vehicles and are used to notify and protect CVs 2310 from malicious vehicles. In all calculations of other VPKI protocol PCRLs, we consider the hash chain optimizations used in SCMS to reduce the PCRL size while in transit. TVSS 10 on the other hand, does not need to use these optimizations as each OBU can have a single PC at any time interval. In order to provide a reasonable projection of PCRL sizes in VPKI, the revocation ratios in another similar domain, namely the internet, are considered; shows that the regular revocation ratio in the internet is ~1.29% of the whole PKI system. Because there might also be cases of mass revocation such as the cyber attack in 2015 which allowed hackers to disable vehicles and triggered Chrysler to recall 1.4 million vehicles, mass revocation with a ratio of 5% was also considered. Considering the US scenario with a total of 350 million vehicles, this would result in a PCRL of ~177 MB in case of regular revocation and ~684 MB in case of mass revocation as shown in Table 2, FIG. 16, which both require high bandwidth. In order to reduce the bandwidth requirements of downloading a PCRL, VPKIs additionally consider utilizing delta PCRLs, where the PCRL is incrementally updated so that the vehicle 2310 only downloads the newly revoked vehicles (i.e., delta PCRL) when it gets network connectivity with the RSU 2308/backend 2306 (e.g., weekly/daily), nonetheless, the PCRL storage requirement at the vehicle 10 stays the same as mentioned earlier. The size of the entire US PCRL size is divided by the number of weeks and days to compute sizes of the weekly/daily delta PCRLs, respectively, as shown in Table 2, in FIG. 16.

In order to reduce the PCRL size, VPKI systems also suggest dividing the revoked certificates on different PCRLs based on some common factor, such as region of revocation (e.g., a state), so that a vehicle 2310 only downloads and keeps a relevant PCRL to it. In Table 2, shown in FIG. 16, the anticipated size of PCRLs in the top four states in the US based on number of vehicles in each state is shown. All states PCRLs require high bandwidth and storage as shown in Table 2, FIG. 16. This approach is not secure because it can still allow a revoked vehicle to maliciously participate in the system outside the region of revocation without being detected as long as the PCs are valid (e.g., SCMS PCs are valid for a week); this can degrade the safety and efficiency of the vehicular environment.

TVSS 10, on the other hand, ties each PC to a very small region (i.e., an area between RSUs), which allows for significantly reduced PCRLs, without having the aforementioned vulnerability. To predict a realistic size of a local PCRL, the total number of vehicles that can fill up an area between RSUs 2309 in a highway is considered. In particular, the real Wyoming deployment of RSUs 2308 in which RSUs 2308 are at most 20 miles apart is considered. The results show that the technique of local PCRLs allows them to be extremely small even in case of mass revocation (~160 KB), which are 13× smaller than delta PCRLs (i.e., the best SCMS choice) which improves the security of the system. Please note that SCMS cannot be adapted to tie PCs to small regions as this would violate anonymity and allow for tracking by the backend.

Evaluation 5: Ratio of Successful Download of PCRL. In this evaluation, a second set of field experiments to show the ratio of success to download PCRLs by CVs 2310 while driving on highways and in the city when passing by RSUs 2308 for both cases of regular revocation (FIG. 10) and mass revocation (FIG. 11) was conducted. These results were collected using the baseline DSRC data rate of 6 Mbps. The PCRL sizes considered in this experiment are the PCRLs that cover the entire US, delta PCRLs (that are weekly/daily updated), specific states PCRLs, and small regions (i.e., novel local PCRLs). The size of each PCRL type is shown an Table 2, FIG. 16. From the experiment results, in both regular and mass revocations, OBUs are not able to download the whole nation-wide, states, and weekly updated PCRLs due to their massive size, which leaves OBUs unable to detect malicious OBUs; thus, these PCRL types are not feasible solutions as they make OBUs become oblivious of revoked and malicious OBUs. For all PCRL types, it as assumed that RSUs already have them stored locally and thus OBUs download them directly from the RSUs 2308 without the need to contact cloud servers so as to reduce network latency. Also note that alternatives to PCRLs such as certificate status inquiry protocols requiring communication with the CA 2304 or some central servers (e.g., OCSP) are not feasible as OBUs use DSRC only and do not always have contact with RSUs 2308.

Figure 10:
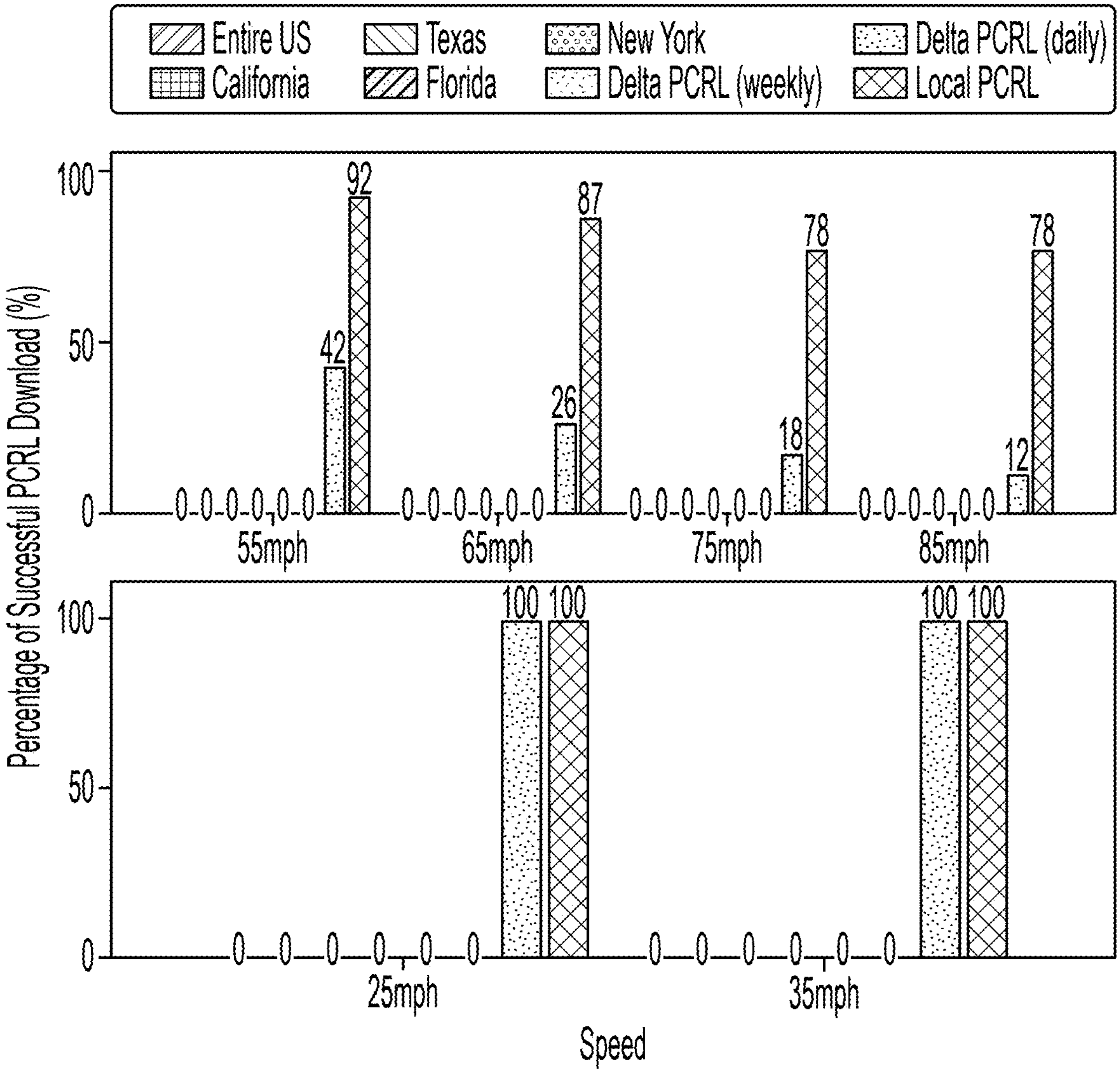
FIG. 10 shows graphs of the success ratio of downloading a complete PCRL under regular revocation for various PCRL sizes in highway speeds (top) and in-city speeds (bottom) in accordance with some embodiments of the present disclosure.
Figure 11:
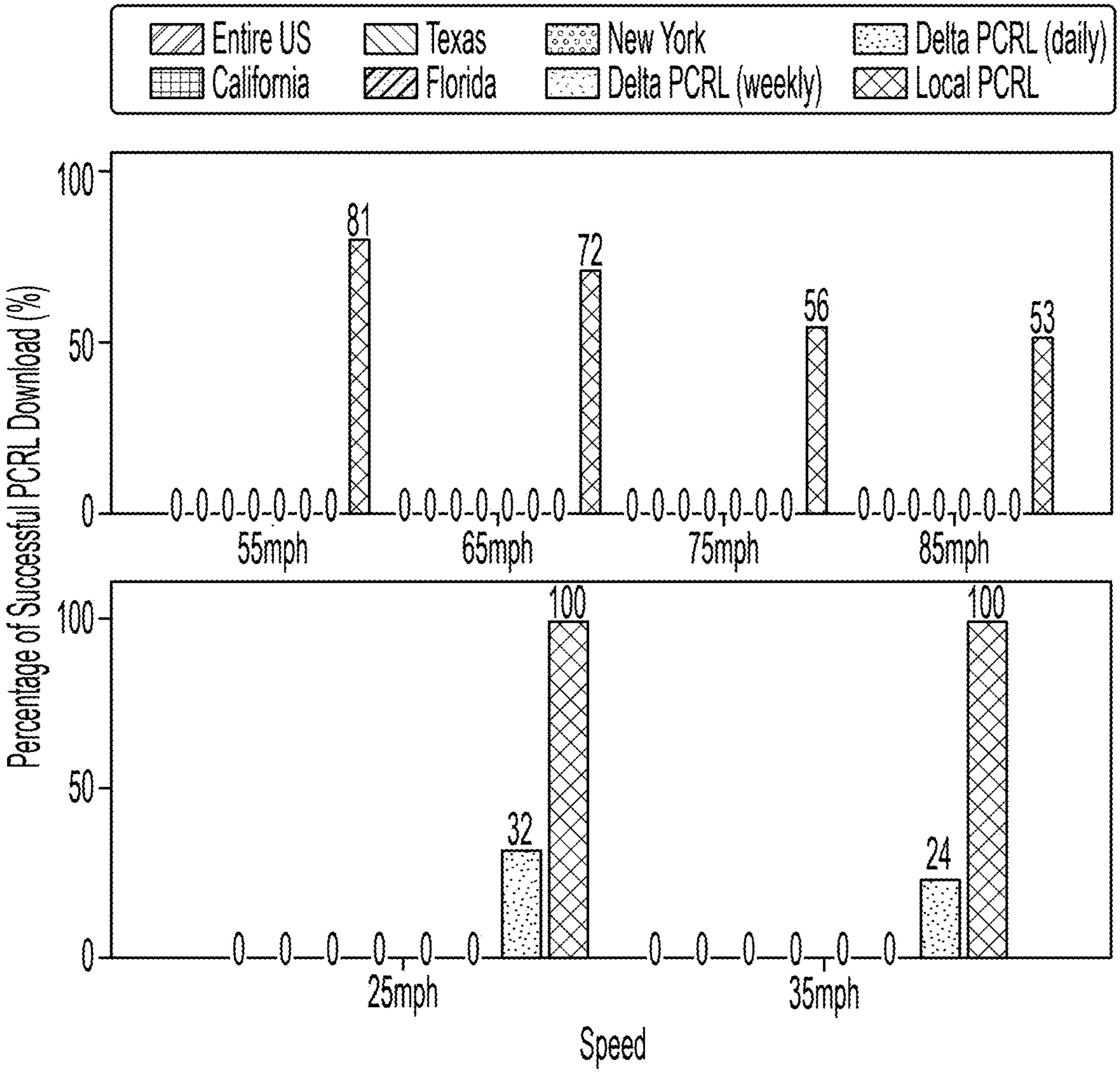
FIG. 11 shows graphs of the success ratio of downloading a complete PCRL under mass revocation for various PCRL sizes in highway speeds (top) and in-city speeds (bottom) in accordance with some embodiments of the present disclosure.

Under regular revocation (FIG. 10; for the regular highway speed of 55 mph, only 42% can download daily delta PCRLs successfully, leaving 58% of legitimate OBUs vulnerable to bogus messages sent by malicious OBUs. On the other hand, local PCRLs show promising results as 92% of the OBUs are able to download them. For the highest highway speed of 85 mph, only 12% can download daily delta PCRLs, leaving 88% of legitimate vehicles unaware of malicious vehicles. Local PCRLs show promising results as 78% of OBUs can download them at this high speed. This improves the safety and efficiency of the vehicular environment as CVs 2310 can quickly detect malicious messages broadcast by revoked OBUs. For in-city speeds (i.e., 25 mph and 35 mph), the results show that 100% success ratio of downloading local PCRLs and daily delta PCRLs under regular revocation, as expected.

Due to the large scale of VPKI, the effect of mass revocation on the system (FIG. 11) is also considered. The experimental results show that in case of mass revocation (i.e., 5% revocation rates), OBUs now cannot download daily delta PCRLs at highway speeds (55 mph-85 mph), which indicates unscalability of this technique under mass revocation. In contrast, unexpectedly, TVSS 10 shows substantial tolerance to such mass revocation cases since 81% and 53% of vehicles are able to download local PCRLs at 55 mph and 85 mph, respectively. For in-city speeds under mass revocation, local PCRLs achieves 100% download success ratio while only 32% of OBUs can download the alternative daily delta PCRLs. This makes local PCRLs a scalable solution, that improves the security of CVs 2310.

Figure 12:
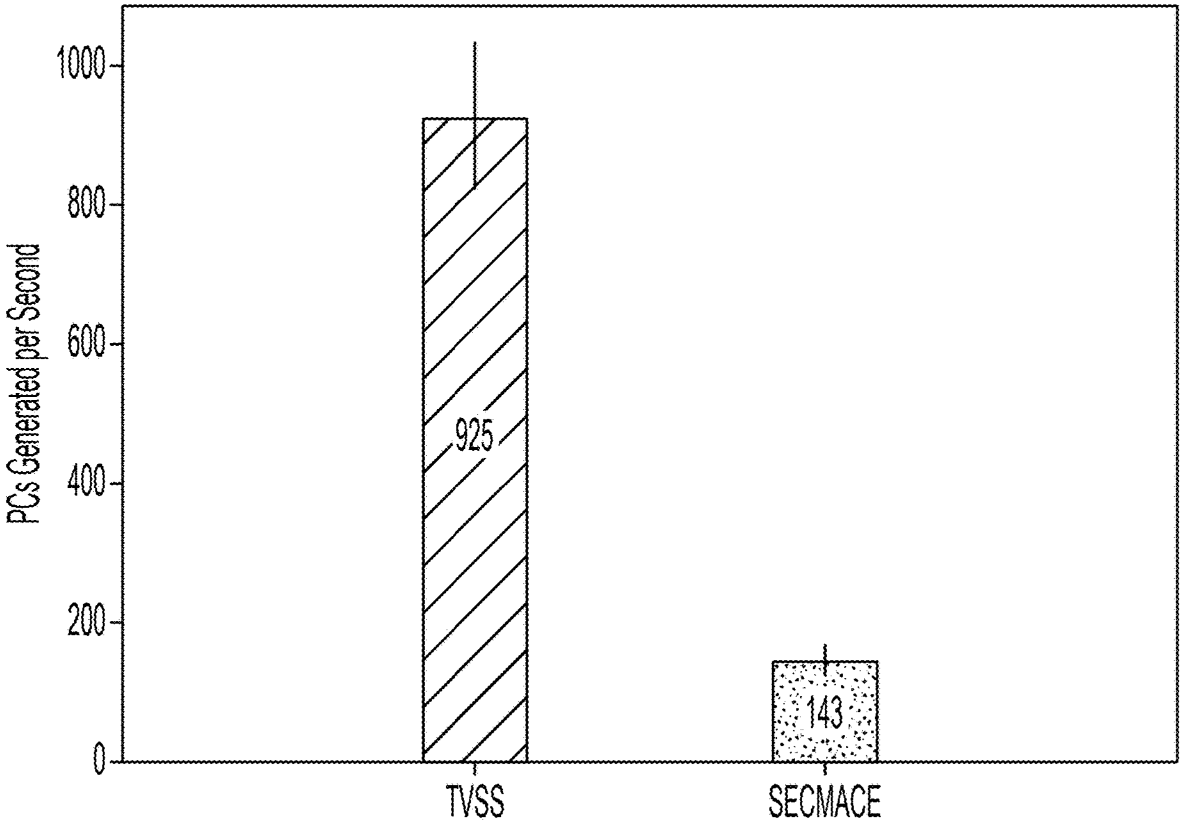
FIG. 12 shows a graph of the Number of PCs generated per second by an RSU in accordance with some embodiments of the present disclosure.

Evaluation 6: RSU Scalability. Since TVSS 10 proposes to move the whole workload to generate PCs to the edge network, in this experiment, the scalability of current road-side equipment (i.e., RSUs 2308) to handle such workloads is examined. It is important to make sure that extra costs by upgrading current RSUs 2308 are not incurred and to avoid otherwise ending up with a fragile deployment. Specifically, extreme situations where an RSU 2308 has to service many OBUs to refresh their PCs in a short time period are considered. SECMACE is also included in the discussion of this experiment to show its RSU scalability (even though SECMACE does not rely on the RSU completely). As shown earlier in FIG. 8, the latency to generate a PC using TVSS 10 and SECMACE on a real RSU 2308 are 1.08 ms and 6.95 ms, respectively. This latency is mostly dominated by cryptographic operations. Consequently, FIG. 12 shows that one RSU 2308 could generate 925 PCs per second for TVSS 10 and 143 PCs per second for SECMACE. To put this into context, a busy interstate is considered and the number of vehicles in a single RSU 2308 coverage area is considered. Considering the radius of 150 meters as specified by US DoT, an interstate with eight lanes could contain at most 500 vehicles. Our results show that the RSU 2308 is able to service 1.85× the vehicles at a busy interstate when using TVSS 10. This indicates that RSUs 2308 have the enough computational capability to generate PCs without having to upgrade them and incur extra costs. It also shows that TVSS 10 presents a scalable solution for VPKI. SECMACE, however, does not scale as it can service only 28.6% of PC generation requests.

Figure 13:
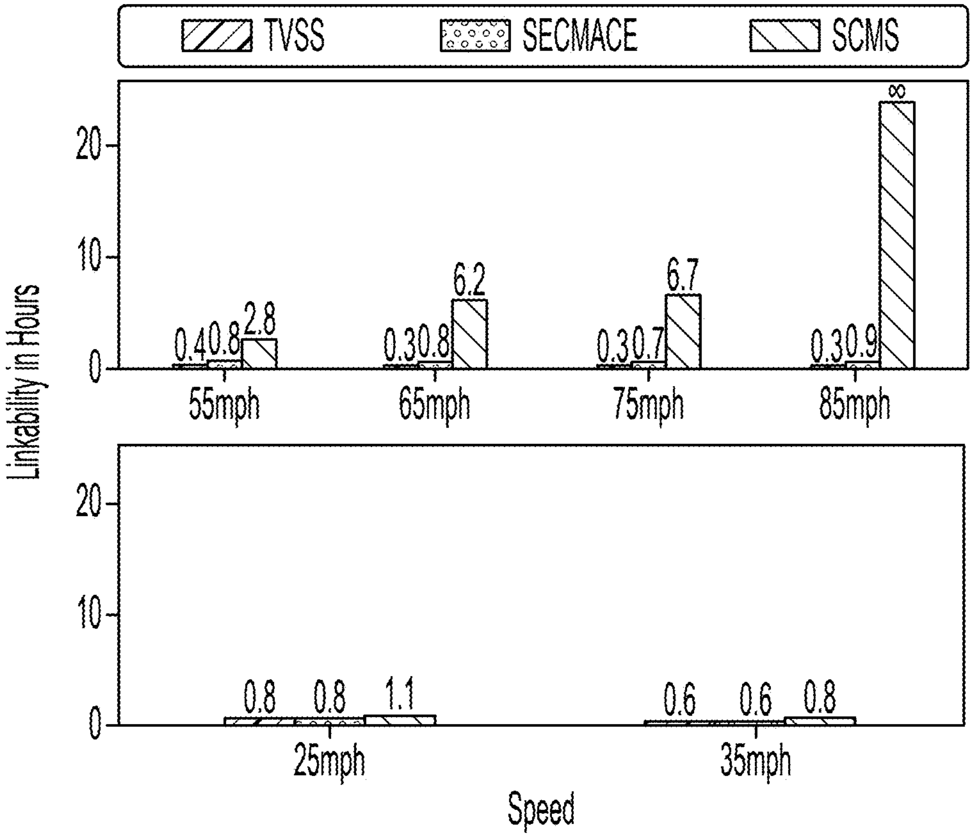
FIG. 13 shows graphs of the vulnerability window to track vehicles in TVSS, SECMACE and SCMS in accordance with some embodiments of the present disclosure.

Evaluation 7: Linkability Window in VPKIs. The unreliability of the CV wireless networks causes a CV 2310 to reuse the same PC for longer periods if the CV 2310 is unable to renew the PC when driving by an RSU 2308. FIG. 13 shows the linkability windows that curious vehicles/authorities have to link messages of a single vehicle when using different VPKIs for two different scenarios, namely in-city and highways; this eventually leads to other vehicles/authorities tracking vehicle driving activities. In order to provide realistic linkability windows, the aforementioned Wyoming deployment in which RSJs 2308 are placed 20 miles apart is considered. Intuitively, it is expected that the faster the CV drives, the faster it reaches the next RSU 2308 (i.e., smaller duration between two RSUs 2308) and updates its PC; this allows PC validity T to become smaller and thus the vulnerability window. As expected in TVSS 10, the results show that the faster the vehicle drives, the smaller the linkability window becomes; this is because CVs 2310 successfully refresh PCs whenever in vicinity of an RSU 2308 in TVSS 10. In contrast, SCMS and SECMACE show a similar pattern but a sharp increase in the vulnerability window when CVs 2310 drive on the highway due to the increased failure ratio of refreshing PCs at high speeds. In particular, SCMS and SECMACE show that a single CV 2310 driving on the highway at 65 mph can be tracked for 6.2 hours and 0.8 hours, respectively, whereas TVSS 10 significantly reduces that vulnerability window to 18 minutes (i.e., ~22.5× and 2.7× reduction in linkability window compared to SCMS and SECMACE, respectively). This makes it harder for adversaries to track CV 2310 driving activities due to the limited linkability window. Therefore, TVSS 10 can considerably decrease T, which improves the privacy of the overall system.

CVs 2310 only have short unreliable connection times with RSUs 2308, the main gateway for internet. This causes cloud-based VPKIs to likely fail to refresh vehicle PCs due to high network latency. Thus, a novel token-based VPKI, TVSS 10, that addresses the shortcomings of other VPKIs is disclosed. TVSS 10 makes use of the edge-computing paradigm, where the PC issuance tasks are pushed to the RSUs 2308. This allows CVs 2310 to obtain PCs with low network latency without violating anonymity or unlinkability properties. Field experiments on the street shows that TVSS 10 is reliable even under high driving speeds as opposed to its alternatives; TVSS 10 can successfully generate PCs for vehicles with a 99% chance whereas that ratio drops to 42% for the best VPKI alternative. TVSS 10 also provides pseudonym certificate revocation lists (PCRLs), that are 13× smaller compared to traditional PCRLs.

Cryptographics

In this section, the basic cryptographic systems that are utilized in SCMS and TVSS 10, namely encryption, digital signatures, decisional Diffie-Hellman (DDH), and hash chains are described.

Encryption Schemes. Encryption schemes are used in cryptography to ensure confidentiality of the information being sent over a network. It can be formally defined as a set of three algorithms (G, Enc, Dec) The algorithms G(1n) outputs the key pair (ek, dk), Enc(msg, ek) outputs a cipher text ct and Dec(dk, ct) outputs the message, msg, by using the decryption key dk. It satisfies the properties of correctness and the security. Correctness says that for all messages, if (ek, dk)←G(1n), then Dec(dk, Enc(msg, ek))=msg. Informally, the security property is that no efficient adversary can decrypt the ciphertext without having access to the decryption key.

Digital Signatures. Digital signatures are basic schemes used in cryptography and used for authentication purposes. A signature scheme can be formally defined as a set of three algorithms (G, Sign, Verify). The algorithms G(1n) outputs the key pair (vk, sk), Sign(msg, sk) outputs a signature σ and Verify(vk, msg, σ) checks whether the signature as valid or not.

Additionally, the correctness and security of the digital signatures must also hold. Correctness says that for all messages msg, if (vk, sk)←G(1n) and σ←Sign(msg, sk), then Verify(vk, msg, σ)=1. Intuitively, security demands that without possession of the secret key, no adversary can produce a valid signature for a new message.

Decisional Diffie-Hellman. The decisional Diffie-Hellman (DDH) problem in a cyclic group G with a generator g is defined. It is defined as follows. Given a tuple (g, gx, h, h') where x is a random exponent, h∈G is random and h' either equals hx or else is a random group element, decide which is the case. In DDH based encryption schemes, the private/public key pair (x, qx) corresponds to the decryption and encryption keys (dk, ek), respectively. Similarly, the key pair (x, gx) corresponds to the signature and verification keys (sk, vk), respectively, in digital signature schemes.

Figure 14:
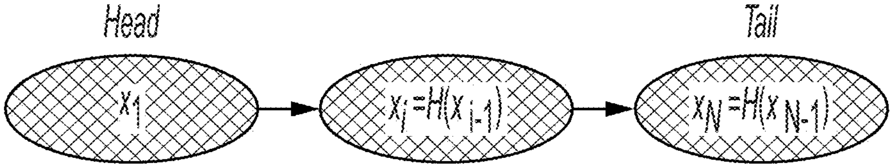
FIG. 14 shows an illustration of a hash chain in accordance with some embodiments of the present disclosure.

Hash Chains. Hash chains are important primitives which appear in authentication schemes. Formally, we can define a hash chain as follows. Given a hash function H, a hash chain is a list of vertices {v1, . . . , vN} where each vi is labeled by a string xi such that xi+1=H (xi) holds for all i (FIG. 14). Since it is computationally infeasible to invert H, hash chains acquire a notion of direction. The first vertex $v_1$ is called the head of the chain, N is the tail. The property that is required is as follows. Given xi, one can compute H (xi)=xi+1 efficiently, but not the other way because of the hardness assumption.

Security Proof

Assume for contradiction that an efficient adversary A wins the VPKI game with non-negligible advantage. A efficient adversary B which breaks the security of the signature scheme (Gen, Sign, Verify) with related advantage is constructed. The first thing B does is guess how A will try to win the VPKI game; it will proceed differently in the three cases. Suppose first, that B decides A will win the forgery version of the VPKI game. In this case, B begins playing as the adversary in the security game for (Gen, Sign, Verify). Specifically, the signature game challenger C draws (vk, sk)~G and sends vk to 8. Then B invokes A and plays as the challenger in the VPKI game. B picks a random vehicle v and a random PC for v and uses vk as the public verification key portion of the PC; all other Queries of A are answered honestly by 8, just as the honest challenger would answer them. If A does indeed decade to win the forgery version of the game, and moreover if A intends to use the selected vehicle v and the selected PC to produce the forgery then 8 proceeds, otherwise B aborts. In case 8 proceeds, B simply forwards A's forged message to C. It is clear that B wins the forgery game whenever A wins the forgery version of the VPKI game using the vehicle v and the selected PC Thus, if A has a non-negligible advantage of winning the forgery version of the VPKI game, then B has non-negligible probability of breaking the signature scheme. Now, let us suppose that A has a non-negligible advantage of breaking either the unlinkability or the anonymity versions of the VPKI game. An information theoretic contradiction in this case is derived by showing that A has the ability to predict a random bit with positive advantage. The key point here as that the PCs are completely independent of the vehicle and of each other and so there is no way A can win the anonymity or unlinkability branch of the game with probability better than ½. This is proved for anonymity, the case of unlinkability is similar. Consider an adversary B who emulates the VPKI challenger in all ways except that it chooses two random vehicles v0 and v1 and it generates two PCs: P0 and $P_1$. Neither PC is associated yet with either vehicle. Now B flips a coin; if heads, 8 associates Pb with vb for b=0, 1; if tails B associates Pb with v1−b for b=0, 1. Now, if A decides to win the anonymity branch of the VPKI game using vehicles $v_0$ and $v_1$, then B sends $P_0$ to A (if A decides to win a different branch, or decides to use different vehicles, then B outputs a random bit. Now, note that if B's coin landed on b, then A needs to return b to win. However, as B's challenge is independent of b, the probability that A returns b is exactly ½. Therefore, it is not possible for A to have an advantage in the anonymity branch of the VPKI game. The same argument shows that A cannot have any advantage in the unlinkability branch.

In summary, it must be that if A has a non-negligible advantage in winning the VPKI game, then this advantage must lie in the forgery branch of the game. However, as shown above, in this case we can design an efficient adversary 8 which breaks the security of the underlying signature scheme.

Figure 21:
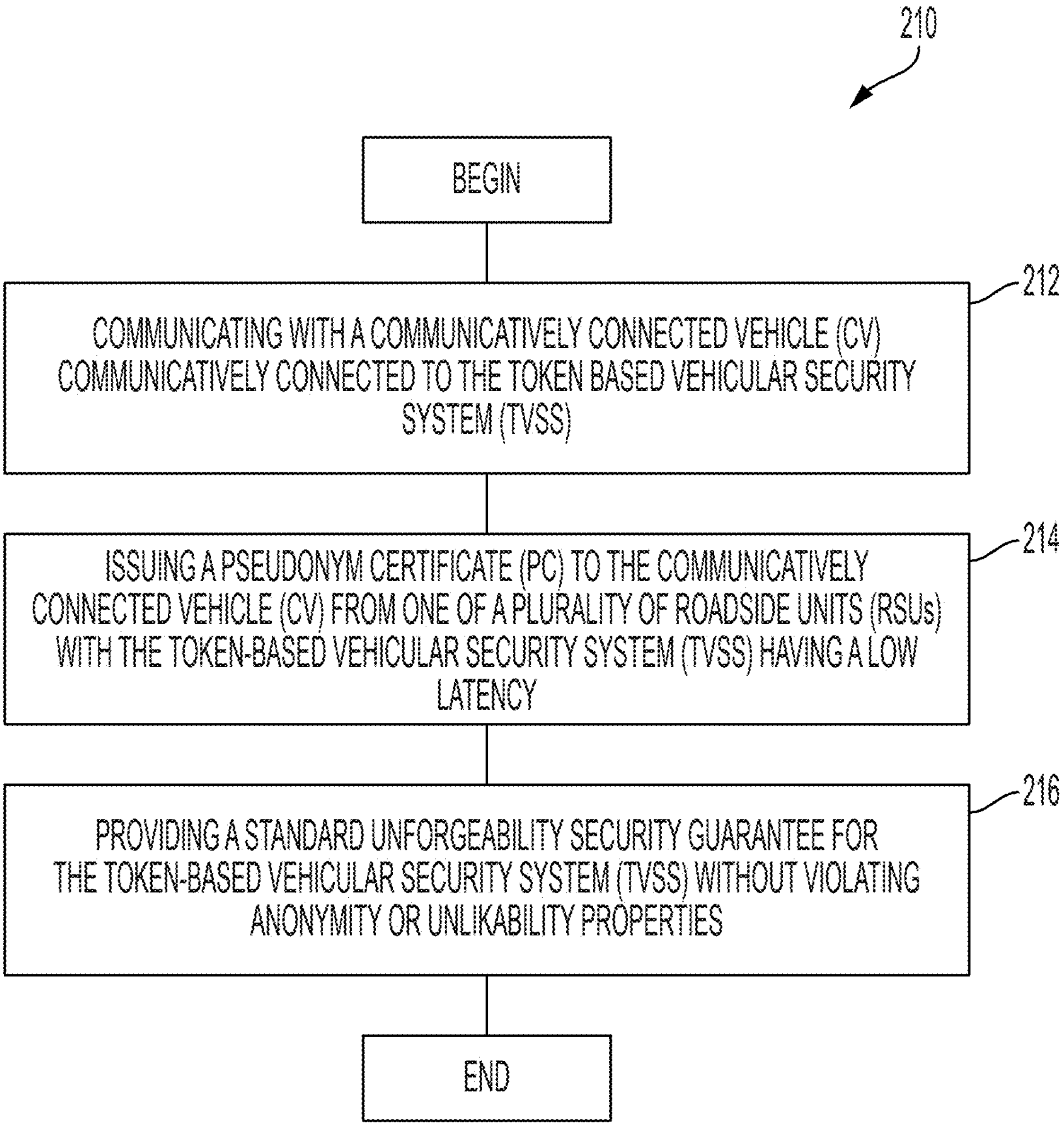
FIG. 21 shows a flow diagram of a method of operation of a token-based vehicular security system (TVSS) in accordance with some embodiments of the present disclosure.

FIG. 21 shows a flow diagram of a method 210 of operation of a token-based vehicular security system (TVSS) in accordance with some embodiments of the present disclosure. Consistent the with the disclosure, the method comprises communicating with a communicatively connected vehicle (CV) communicatively connected to the token based vehicular security system (TVSS) (block 212); issuing a pseudonym certificate (PC) to the communicatively connected vehicle (CV) from one of a plurality of roadside units (RSUs) with the token-based vehicular security system (TVSS) having a low latency (block 214); and providing a standard unforgeability security guarantee for the token based vehicular security system (TVSS) without violating anonymity or unlinkability properties (block 216). In some is embodiments, the method further comprises communicating with the communicatively connected vehicle (CV) moving at a speed of between about 25 miles per hour and about 85 miles per hour. In some embodiments, communicating with the communicatively connected vehicle (CV) communicatively connected to the token based vehicular security system (TVSS) comprises completing a transaction between one of the plurality of roadside units (RSUs) and the communicatively connected vehicle in less than about one-hundred milliseconds. In some embodiments, issuing the pseudonym certificate (PC) for the communicatively connected vehicle (CV) from one of the plurality of roadside units (RSUs) with the token-based vehicular security system (TVSS) having the low latency comprises issuing the pseudonym certificate (PC) for the communicatively connected vehicle (CV) from one of the plurality of roadside units (RSUs) with the token-based vehicular security system (TVSS) having the low latency being between about one millisecond and about two milliseconds. In some embodiments, the method further comprises receiving the pseudonym certificate (PC) at the communicatively connected vehicle (CV) from one of the plurality of roadside units (RSUs) with a probability of success of between about 93% and about 99% with the communicatively connected vehicle moving at a speed of about 85 miles per hour.

In some embodiments, the method further comprises updating the pseudonym certificate (PC); and maintaining an average time between updates of the pseudonym certificate of less than about eighteen minutes with about 20 miles between each of the plurality of roadside units.

Figure 22:
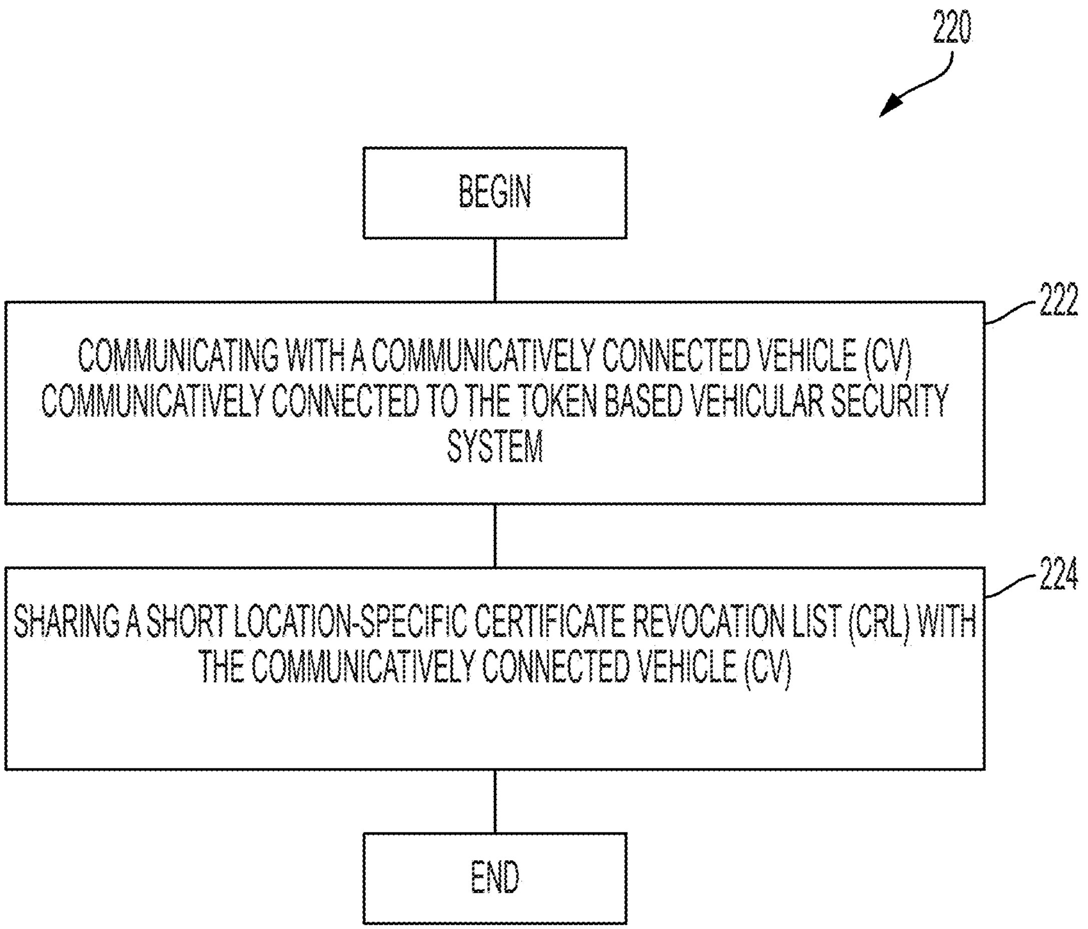
FIG. 22 shows a flow diagram of a method of operating a token-based vehicular security system (TVSS) in accordance with some embodiments of the present disclosure.

FIG. 22 shows a flow diagram of method 220 of operating a token-based vehicular security system (TVSS) in accordance with some embodiments of the present disclosure. Consistent with the disclosed embodiments, the method comprises communicating with a communicatively connected vehicle (CV) communicatively connected to the token based vehicular security system (block 222); and sharing a short location-specific certificate revocation list (CRL) with the communicatively connected vehicle (CV) (block 224). In some embodiments, sharing the short location-specific certificate revocation list (CRL) with the communicatively connected vehicle (CV) comprises sharing the short location-specific certificate revocation list (CRL) with the communicatively connected vehicle comprises sharing the short location-specific certificate revocation list (CRL) with the connected vehicle with no online involvement of the backend or communication back to the certificate authority. In some embodiments, the short location-specific certificate revocation list (CRL) is about 13 times smaller than a traditional certificate revocation list.

Figure 23:
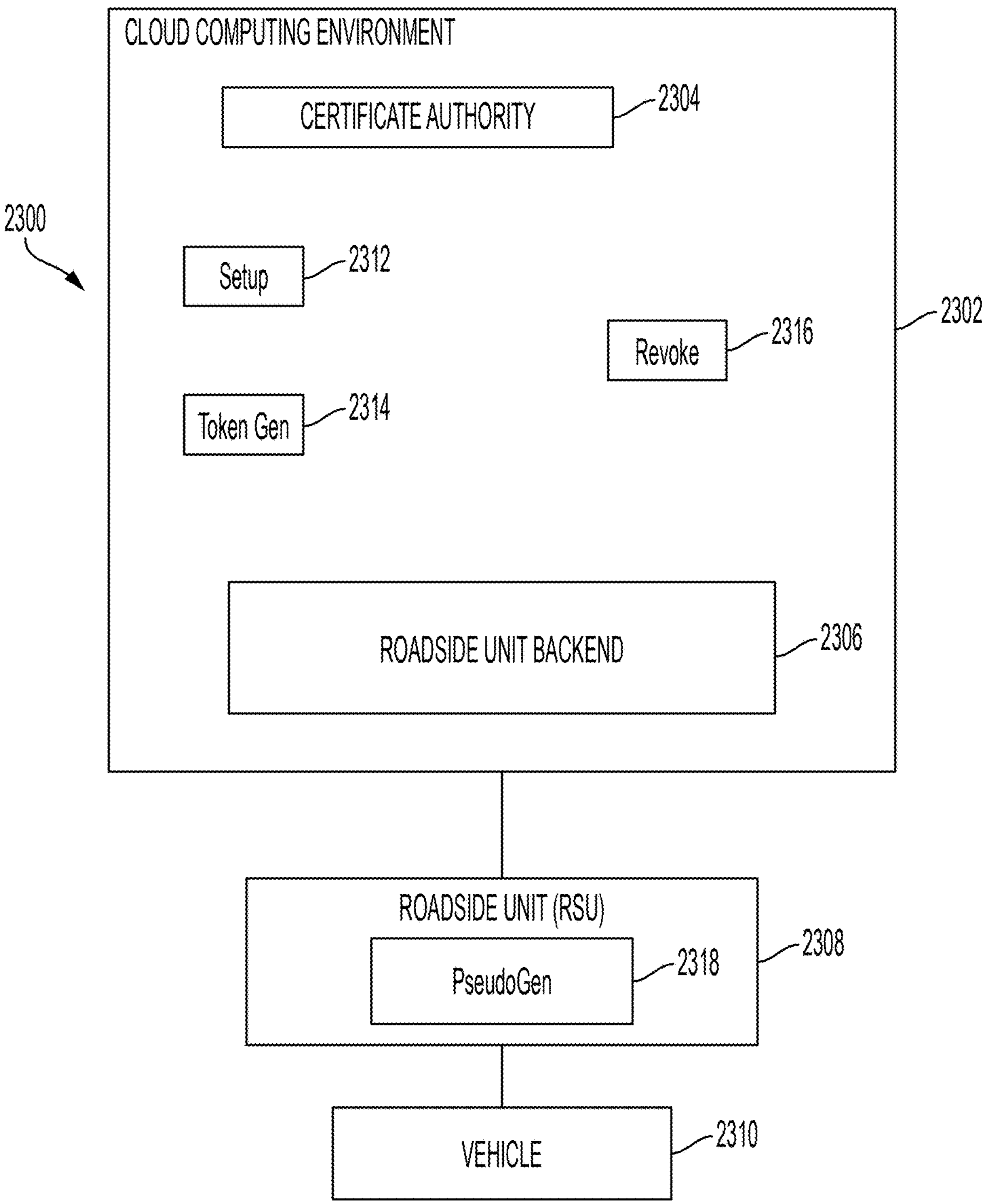
FIG. 23 shows a block diagram of a token-based vehicular security system in accordance with some embodiments of the present disclosure.

FIG. 23 shows a block diagram of a token-based vehicular security system 2300 in accordance with some embodiments of the present disclosure. The token-based vehicular security system 2300 includes a roadside unit (RSU) 2308, a certificate authority (CA) 2304, a SETUP 2312 protocol, a TOKENGEN 2314 protocol, a PSEUDOGEN 2318 protocol, and a REVOKE 2316 protocol. The roadside unit (RSU) 2308 is communicatively connected to a roadside unit backend 2306 included in a cloud computing environment 2302. The certificate authority (CA) 2304 is included in the cloud computing environment 2302, and the certificate authority (CA) 2304 is communicatively connected to the roadside unit backend 2306. In operation, the SETUP 2312 protocol enables the communicatively connected vehicle (CV) 2310. The communicatively connected vehicle (CV) 2310 is communicatively connected to the token based vehicular security system 2300. In operation, the communicatively connected vehicle (CV) 2310 acquires a long-term enrollment certificate (EC) from the certificate authority (CA) 2304. The communicatively connected vehicle 2310 includes an onboard unit capable of being communicatively connected to the roadside unit (RSU) 2308. In operation, the TOKENGEN 2314 protocol enables the communicatively connected vehicle 2310 to acquire a plurality of authorization tokens from the certificate authority (CA). In operation, the PSEUDOGEN 2318 protocol enables the communicatively connected vehicle (CV) 2310 to request a pseudonym certificate (PC) from the roadside unit (RSU) 2308 in exchange for one of the plurality of authorization tokens. In operation, the REVOKE 2316 protocol enables the roadside unit backend 2306 and the certificate authority (CA) 2304 to cooperate to deactivate an adversarial vehicle credential.

In some embodiments, the certificate authority (CA) 2304 and the roadside unit (RSU) 2308 meet an infrastructure/backend separation assumption. In some embodiments, the pseudonym certificate (PC) has a short lifespan. In some embodiments, the short lifespan is dynamically set based on vehicle velocity and a distance between roadside units (RSUs) 2308. In some embodiments, the roadside unit (RSU) 2308 is connected to the roadside unit backend 2306 that communicates with but is distinct from the certificate authority (CA) 2304. In some embodiments, the PSEUDO-GEN 2318 protocol is at least 7.6 times less likely to fail than a standard Security Certificate Management System for the communicatively connected vehicle (CV) having a velocity of 55 miles per hour. In some embodiments, the communicatively connected vehicle (CV) 2310 is operating in a particular geographical area and the communicatively connected vehicle (CV) 2310 receives an adversarial pseudonym certificate (PC) from the roadside unit (RSU) 2308 only for an adversarial vehicle operating in the particular geographical area. TVSS 10, as shown in FIG. 2, is a simplified block diagram of TVSS 2300, as shown in FIG. 23. Each element of a plural entity, such as CVs, as used herein, are understood to be substantially equivalent to the singular entity, such as CV. And each individual connected vehicle (CV) is understood, as used herein, to be substantially equivalent to vehicle, used herein.

Reference throughout this specification to "an embodiment," "some embodiments," or "one embodiment." means that a particular feature, structure, material, or characteristic described in connection with the embodiment is included in at least one embodiment of the present disclosure. Thus, the appearances of the phrases such as "in some embodiments," "in one embodiment," or "in an embodiment," in various places throughout this specification are not necessarily referring to the same embodiment of the present disclosure. Furthermore, the particular features, structures, materials, or characteristics may be combined in any suitable manner in one or more embodiments.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the disclosure.

What is claimed is:

1. A method of operating a token-based vehicular security system (TVSS), the method comprising:

enrolling a vehicle with a certificate authority to configure a communicatively connected vehicle (CV) for communicatively connecting to the token based vehicular security system (TVSS);

receiving a plurality of tokens from the certificate authority;

trading at least one of the plurality of tokens received from the certificate authority for at least one pseudonym certificate from at least one of a plurality of roadside units (RSUs), the pseudonym certificate having been issued by the RSU pursuant to authority delegated by the certificate authority; and issuing the at least one traded-for pseudonym certificate (PC) to the communicatively connected vehicle (CV) to use for secure communications.

2. The method of claim 1, further comprising sharing a short geographic location-specific certificate revocation list (CRL) with the communicatively connected vehicle (CV).

3. The method of claim 2 wherein communicating with the communicatively connected vehicle (CV) communicatively connected to the token based vehicular security system (TVSS) comprises:

completing a transaction between one of the plurality of roadside units (RSUs) and the communicatively connected vehicle in less than about one-hundred milliseconds.

4. The method of claim 1, wherein issuing the pseudonym certificate (PC) for the communicatively connected vehicle (CV) from one of the plurality of roadside units (RSUs) with the token-based vehicular security system (TVSS) having the low latency comprises:

issuing the pseudonym certificate (PC) for the communicatively connected vehicle (CV) from one of the plurality of roadside units (RSUs) with the token-based vehicular security system (TVSS) having the low latency being between about one millisecond and about two milliseconds.

5. The method of claim 1, wherein the roadside unit (RSU) is connected to a roadside unit backend that communicates with but is distinct from the certificate authority (CA).

6. The method of claim 1, wherein the communicatively connected vehicle (CV) is operating in a particular geographical area, the communicatively connected vehicle (CV) further receiving an adversarial pseudonym certificate (PC) from the roadside unit (RSU) only for an adversarial vehicle, which is different from the CV, in the particular geographical area.

7. The method of claim 1 wherein the RSUs are pre-authorized by the certificate authority to have been delegated to create the at least one pseudonym certificate.

* * * * *